(12) United States Patent
Wiegman

(10) Patent No.: US 12,172,539 B2
(45) Date of Patent: Dec. 24, 2024

(54) SYSTEMS AND METHODS WITH A SAFETY FEATURE FOR CHARGING AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 297 days.

(21) Appl. No.: 17/562,126

(22) Filed: Dec. 27, 2021

(65) Prior Publication Data

US 2023/0133068 A1    May 4, 2023

Related U.S. Application Data

(63) Continuation-in-part of application No. 17/515,446, filed on Oct. 30, 2021, now Pat. No. 11,813,955.

(51) Int. Cl.
*B60L 53/62* (2019.01)
*B60L 53/16* (2019.01)
(Continued)

(52) U.S. Cl.
CPC ............... *B60L 53/62* (2019.02); *B60L 53/16* (2019.02); *B60L 53/35* (2019.02); *B64D 27/24* (2013.01); *B64F 1/362* (2013.01); *H02J 7/0029* (2013.01); *H02J 7/0045* (2013.01); *B60L 2200/10* (2013.01)

(58) Field of Classification Search
CPC ........ B60L 53/65; B60L 53/305; B60L 53/36; B60L 53/66; B60L 2200/10
See application file for complete search history.

(56) References Cited

U.S. PATENT DOCUMENTS

| 9,630,517 B2 | 4/2017 | Lee et al. |
| 9,902,504 B2 | 2/2018 | Moore |

(Continued)

FOREIGN PATENT DOCUMENTS

JP    2021125893 A    *    8/2021    .............. B60L 53/50

OTHER PUBLICATIONS

Machine translation of JP-2021125893-A (Year: 2024).*

*Primary Examiner* — David V Henze-Gongola
(74) *Attorney, Agent, or Firm* — Hoffman Warnick LLC

(57) ABSTRACT

A system with a safety feature for charging an electric aircraft. The system includes an electric aircraft port of an electric aircraft, a sensor on the electric aircraft, and a computing device communicatively connected to the electric aircraft port and the sensor. The electric aircraft port is configured to mate with a charging connector. The sensor is configured to detect a sensor datum of the charging connector. The computing device is configured to receive the sensor datum, generate a charging instruction set as a function of the sensor datum, transmit the charging instruction set to the electric aircraft port, and enable charging of the electric aircraft, by the charging connector and through the electric aircraft port, as a function of the charging instruction set. The charging instruction set includes a safety lock instruction. A method with a safety feature for charging an electric aircraft is also provided.

20 Claims, 11 Drawing Sheets

(51) Int. Cl.
  *B60L 53/35* (2019.01)
  *B64D 27/24* (2024.01)
  *B64F 1/36* (2024.01)
  *H02J 7/00* (2006.01)

(56) References Cited

U.S. PATENT DOCUMENTS

| | | |
|---|---|---|
| 10,479,528 B1 * | 11/2019 | Liang .................... G06Q 20/127 |
| 10,611,252 B2 | 4/2020 | Wang et al. |
| 10,850,866 B2 | 12/2020 | Fisher et al. |
| 11,091,043 B2 | 8/2021 | Wang |
| 11,813,955 B2 * | 11/2023 | Wiegman ................ B60L 53/68 |
| 2015/0224890 A1 * | 8/2015 | Kim ........................ B60L 53/62 |
| | | 320/109 |
| 2016/0221688 A1 * | 8/2016 | Moore ..................... F21V 33/00 |
| 2016/0311334 A1 * | 10/2016 | Moravick ............... B60L 58/12 |
| 2016/0311529 A1 | 10/2016 | Brotherton-Ratcliffe et al. |
| 2017/0139409 A1 | 5/2017 | Clarke |
| 2017/0225802 A1 | 8/2017 | Lussier et al. |
| 2018/0257502 A1 | 9/2018 | Park |
| 2019/0337407 A1 | 11/2019 | Wang |
| 2020/0207230 A1 * | 7/2020 | Evans ..................... B60L 53/34 |
| 2020/0269977 A1 | 8/2020 | Noble et al. |
| 2021/0039781 A1 | 2/2021 | Yao et al. |
| 2021/0245623 A1 | 8/2021 | Zhao |

\* cited by examiner

SYSTEMS AND METHODS WITH A SAFETY FEATURE FOR CHARGING AN ELECTRIC AIRCRAFT

CROSS-REFERENCE TO RELATED APPLICATIONS

This application is a continuation-in-part of Non-provisional application Ser. No. 17/515,446 filed on Oct. 30, 2021 and entitled "SYSTEMS AND METHODS FOR A SAFETY FEATURE FOR CHARGING AN ELECTRIC AIRCRAFT," the entirety of which is incorporated herein by reference.

FIELD OF THE INVENTION

The present invention generally relates to the field of charging systems for electric aircraft. In particular, the present invention is directed to systems and methods for a safety feature for charging an electric aircraft.

BACKGROUND

The inception of electric powered vehicles contributed to the necessary implementation of electric vehicle (EV) charging stations to power electric vehicles. Electric aircrafts comparatively require frequent stops at a charging station to recharge their batteries. Mismanaged recharging of the battery of an electric aircraft poses greater risk to deterioration, causing considerable stress or damage to various systems of the electric aircraft. Mismanaged recharging also poses the risk of excessive flow of electric energy. Ensuring proper management requires meticulous consideration and implementation of various security measures to ensuring optimal electrical energy transfer and avoiding excessive electric energy waste.

SUMMARY OF THE DISCLOSURE

In an aspect a system with a safety feature for charging an electric aircraft is provided. The system includes an electric aircraft port of an electric aircraft, a sensor on the electric aircraft, and a computing device communicatively connected to the electric aircraft port and the sensor. The electric aircraft port is configured to mate with a charging connector. The sensor is configured to detect a sensor datum of the charging connector. The computing device is configured to receive the sensor datum, generate a charging instruction set as a function of the sensor datum, transmit the charging instruction set to the electric aircraft port, and enable charging of the electric aircraft, by the charging connector and through the electric aircraft port, as a function of the charging instruction set. The charging instruction set includes a safety lock instruction.

In another aspect a method with a safety feature for charging an electric aircraft is provided. The method includes mating an electric aircraft port of an electric aircraft with a charging connector, detecting, by a sensor on the electric aircraft, a sensor datum of the charging connector, receiving, by a computing device communicatively connected to the electric aircraft port and the sensor, the sensor datum, generating, by the computing device, a charging instruction set as a function of the sensor datum, wherein the charging instruction set comprises a safety lock instruction, transmitting, by the computing device, the charging instruction set to the electric aircraft port, and enabling, by the computing device, charging of the electric aircraft by the charging connector and through the electric aircraft port as a function of the charging instruction set.

In yet another aspect, a system for a safety feature for charging an electric aircraft is presented. The system includes a sensor, wherein the sensor is configured to detect a sensor datum from an electric aircraft. The system further includes a computing device, wherein the computing device is configured to receive the sensor datum, authenticate the electric aircraft, generate a charging instruction set as a function of the sensor datum, wherein the charging instruction set comprises a safety lock instruction, and transmit the charging instruction set to a charging connector. The system further includes a charging connector, wherein the charging connector is configured to connect to an electric aircraft port of the electric aircraft and perform the charging instruction set on the electric aircraft set as a function of the electric aircraft port.

In a further aspect, a method for a safety feature for charging an electric aircraft is provided. The method includes detecting, by a sensor, a sensor datum from an electric aircraft, receiving, by a computing device, the sensor datum, authenticating the electric aircraft, generating a charging instruction set as a function of the sensor datum, wherein generating the charging instruction set further comprises generating a safety lock instruction, transmitting the charging instruction set to a charging connector, connecting the charging connector, to an electric aircraft port of the electric aircraft, and performing the charging instruction set on the electric aircraft set as a function of the electric aircraft port.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
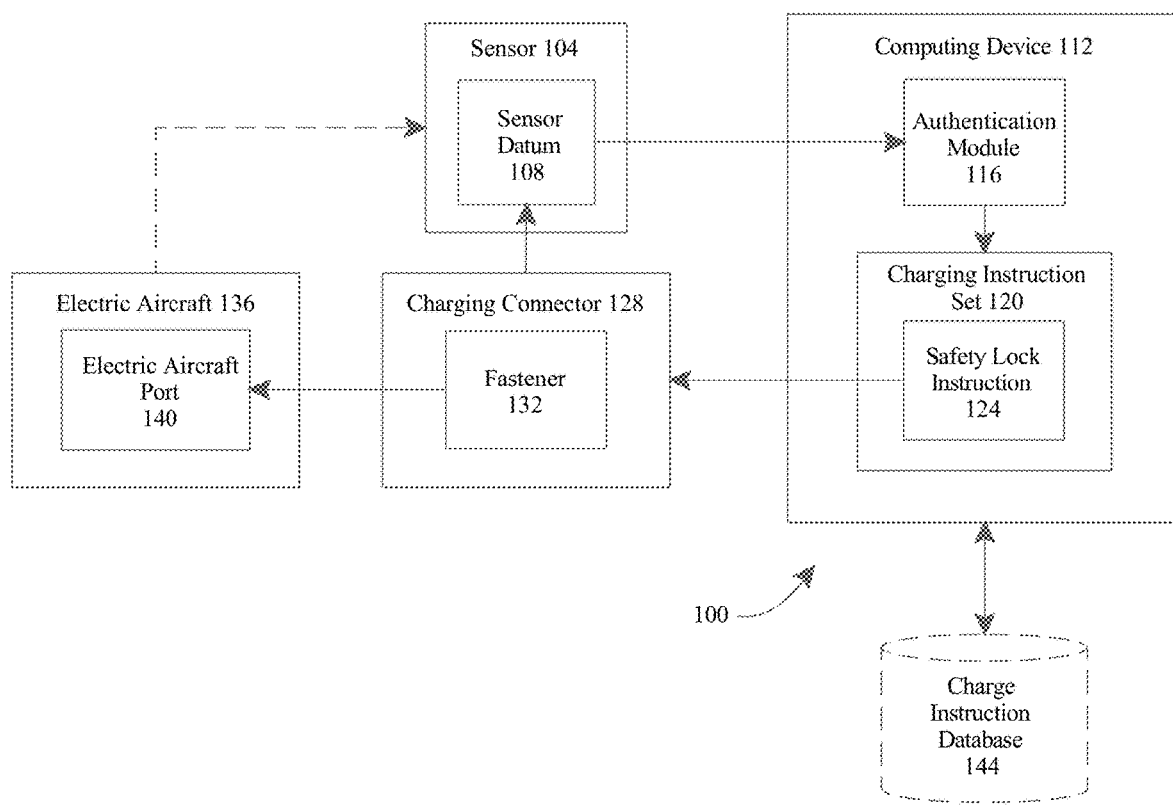
FIG. 1 is a block diagram of an exemplary embodiment of a system for a safety feature for charging an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods with a safety feature for charging an electric aircraft. In an embodiment, a computing device can use sensory data to control charging at an electric aircraft port of an electric aircraft. Aspects of the present disclosure can be used to implement a safety lock mechanism to disable inappropriate or unsuitable charging of an electric aircraft at a particular charging connector and/or charging station. Aspects of the present disclosure can also be used to enable uninterrupted charging, as needed or desired. This is so, at least in part, because a locking fastener can be actuated by computing device to enable or disable mating between electric aircraft port and charging connector. Advantageously, aspects of the present disclosure allow for an enhanced dimension of safety for charging or recharging electric aircraft.

In certain instances, at a high level, aspects of the present disclosure are directed to systems and methods for a safety feature for charging an electric aircraft. In an embodiment, aspects of the present disclosure can be used to charge or recharge the battery of an electric aircraft, such as an electrical vertical take-off and landing (eVTOL) aircraft. In another embodiment, electric aircraft may include unmanned aerial vehicles (UAV), drones, and the like thereof. The present disclosure can be an infrastructure designed to support the landing and maintaining of electric aircrafts or a plurality of electric aircrafts and may include a landing terminal or landing pad for electric aircrafts to descend upon.

In certain other instances, aspects of the present disclosure can be used to authenticate electric aircrafts or give access to electric aircrafts to charge their batteries. This is so, at least in part, to maximize security and provide charging capabilities to authorized electric aircrafts. In an embodiment, aspects of the present disclosure can include a cloud network which may verify and authorize various electric aircrafts.

In certain further instances, aspects of the present disclosure allow for preventing overcharge of electric energy. Aspects of the present disclosure can also allow for providing an uninterrupted transfer of electrical energy only in the event the electric aircraft and electric aircraft charger are connected securely. In an embodiment, the present disclosure may include a lock that may shut off the charger from overcharging or wasting electric energy or prevent any interruptions during a charging process. Aspects of the present disclosure can be used on a recharging station which may include a recharging landing pad for electric aircrafts to descend upon and recharge their batteries. Exemplary embodiments illustrating aspects of the present disclosure are described below in the context of several specific examples.

Referring now to FIG. 1, an exemplary embodiment of a system 100 for a safety feature for charging an electric aircraft is presented. System includes computing device 112. In a non-limiting embodiment, computing device 112 may include a flight controller. In a non-limiting embodiment, computing device 112 may include any remote controller. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 112 and/or the flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. The computing device may harmonize vehicle flight dynamics with best handling qualities utilizing the minimum amount of complexity whether it be additional modes, augmentation, or external sensors as described herein.

With continued reference to FIG. 1, system 100 may include sensor 104. A "sensor," for the purposes of this disclosure in some cases, is an electronic device configured to detect, capture, measure, or combination thereof, a plurality of external and electric vehicle component quantities. Sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. In a non-limiting embodiment, sensor 104 may be electrically connected to charging connector 128. "Electrically connected", for the purposes of this disclosure, is two or more components electrically, or otherwise connected and configured to transmit and receive signals from one another. Sensor 104 may include circuitry or electronic components configured to digitize, transform, or otherwise manipulate electrical signals. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. In a non-limiting embodiment, sensor 104 may detect a plurality of physical characteristics of charging connector 128 and/or the battery pack of electric aircraft 136 once sensor 104 is electrically connected to charging connector 128. For example and without limitation, sensor 104 may detect the level of heat generated and the level of connection between electric 136 and charging connector 128. The plurality of datum captured by sensor 104 may include circuitry, computing devices, electronic components or a combination thereof that translates into at least an electronic signal configured to be transmitted to another electronic component. Sensor 104 may be disposed onto charging connector 128. In a non-limiting embodiment, sensor 104 may be disposed onto an infrastructure designed to support the landing and charging of a plurality of electric aircrafts. "Disposed," for the purpose of this disclosure, is the physical placement of a computing device on an actuator. In a non-limiting embodiment, actuator may include a flight component. In a non-limiting embodiment, sensor 104 may include a plurality of individual sensors disposed on each actuator of the electric aircraft. In a non-limiting embodiment, sensor 104 may be mechanically and communicatively connected to one or more throttles. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 and titled, "Hover and Thrust Control Assembly for Dual-Mode Aircraft", which is incorporated herein in its entirety by reference. Sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Inceptor stick may include any inceptor stick as described in the entirety of this disclosure. Persons skilled in the art, upon reviewing the entirety of this disclosure, will be aware various embodiments and functions of a pilot input and inceptor stick for purposes as described herein.

With continued reference to FIG. 1, in a non-limiting embodiment, system 100 may include a recharging landing pad. A "recharging landing pad," for the purpose of this disclosure, is an infrastructure designed to support the landing and charging of a plurality of electric aircrafts. For instance and without limitation, the recharging landing pad may be consistent with the recharging landing pad in U.S. patent application Ser. No. 17/361,911 and title, "RECHARGING STATION FOR ELECTRIC AIRCRAFTS AND A METHOD OF ITS USE," which is incorporated in its entirety herein. The recharging landing pad may incorporate system 100 to charge electric aircrafts. In a non-limiting embodiment, sensor 104 may be disposed onto the recharging landing pad. For example and without limitation, sensor 104 may detect nearby electric aircrafts in the air which may be descending onto the electric aircraft. In a non-limiting embodiment, sensor 104 may be disposed onto the recharging landing pad to detect, monitor, and maintain the descent, land, charging, and take-off of the electric aircraft onto the recharging pad. This is so, at least in part, to accurately measure the electric aircraft wherein sensor 104 is disposed onto a location on the recharging landing pad that is ideal in connecting incoming electric aircrafts to the recharging landing pad for recharging. Persons skilled in the art, upon reviewing the entirety of this disclosure, will be aware of the various embodiments of the recharging landing pad and the configuration of the placement of sensor 104 for purposes as described herein.

With continued reference to FIG. 1, in a non-limiting embodiment, system 100 may be incorporated with a recharging station which includes the recharging landing pad and various infrastructure and/or equipment to support the functions of the components of system 100. A "recharging station," for the purpose of this disclosure, is an infrastructure that incorporates a plurality of equipment used to support the maintenance and charging of electric aircrafts. For instance and without limitation, the recharging station may be consistent with the recharging station in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. In a non-limiting embodiment, the recharging station may include any infrastructure that may support the landing, docking, charging, and the like thereof, of electric aircraft 136 or a plurality of electric aircrafts. The recharging station may include a docking terminal. A "docking terminal," for the purposes of this disclosure, refers to an infrastructure or hub used to hold an electric aircraft and/or connect electric devices. The docking terminal may include charging connector 128 that may be connected to electric aircraft port 140 of electric aircraft 136. Persons skilled in the art, upon reviewing the entirety of this disclosure, will be aware of various embodiments of the recharging station that may house or support the use of charging connector 128 for purposes as described herein.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may further include a sensor suite. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. In a non-limiting embodiment, sensor 104 may include a proximity sensor. A "proximity sensor," for the purpose of this disclosure, is a sensor configured to detect the presence of nearby aircrafts or environmental objects in the air. In a non-limiting embodiment, the proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In an embodiment, the proximity sensor may be configured to detect the location of an incoming electric aircraft, the distance of the electric aircraft from the proximity sensor, the attitude and/or altitude of the electric aircraft, and the velocity or deacceleration of the electric aircraft as it descends onto the recharging landing pad of system 100 to recharge its battery. In some embodiment, the proximity sensor may include, a capacitive sensor, a capacitive displacement sensor, a Doppler effect (sensor based on doppler effect) sensor, an inductive sensor, a magnetic sensor, an optical sensor, a photoelectric sensor, a laser rangefinder sensor, a passive thermal infrared sensor, a radar, a sonar, an ultrasonic sensor, a fiber optics sensor, a Hall effect sensor, and the like thereof. At least a sensor 104 may include circuitry, computing devices, electronic components or a combination thereof that translates sensor datum 108 into at least an electronic signal configured to be transmitted to another electronic component.

With continued reference to FIG. 1, sensor 104 may be configured to detect sensor datum 108. A "sensor datum," for the purpose of this disclosure in some cases, is any datum or element of data describing parameters captured by sensor 104 describing the outside environment and physical values describing the performance or qualities of flight components of the electric aircraft. In a non-limiting embodiment, sensor datum 108 may include any data captured by any sensor as described in the entirety of this disclosure. Additionally and alternatively, sensor datum 108 may include any element or signal of data that represents an electric aircraft route and various environmental or outside parameters. In a non-limiting embodiment, sensor datum may include an element of that representing the safest, most efficient, shortest, or a combination thereof, flight path. In a non-limiting embodiment, sensor datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, sensor datum 108 may include information about the location of an incoming electric aircraft, the distance of the electric aircraft from the proximity sensor, the attitude and/or altitude of the electric aircraft, and the velocity or deacceleration of the electric aircraft as it descends onto the recharging landing pad of system 100 to recharge its battery. In a non-limiting embodiment, sensor datum 108 may include any information about an electric aircraft and its cargo, personnel, pilot, and the like thereof. For example and without limitation, sensor datum 108 may include aircraft type, the weight of cargo, number of personnel or passengers, type of battery, battery capacity, remaining battery, and the like thereof. In a non-limiting embodiment, electric aircraft 136 may transmit information about itself to computing device 112 which may be detected by sensor 104. For example and without limitation, sensor 104 may be electronically connected to computing device 112, in which sensor 104 may translate the information from electric aircraft 136 into sensor datum 108, in which computing device 112 may translate sensor datum 108 for further purposes described herein.

With continued reference to FIG. 1, sensor 104 may detect a battery pack datum from electric aircraft 136. The battery pack datum may be part of sensor datum 108. A "battery pack datum," for the purpose of this disclosure, is an element of data representative of one or more characteristics corresponding to at least a portion of a battery pack of an electric aircraft and/or its components. A "battery pack," for the purpose of this disclosure, is a set of any number of individual battery modules or identical battery modules configured to power the electric aircraft. A "battery module", for the purpose of this disclosure, is a source of electric power consisting of one or more electrochemical cells. In a non-limiting embodiment, the battery pack datum may include any data and/or information about the state of the battery pack. the battery pack datum may include information about the make and model of the battery pack, rate of recharge of the battery pack, rate of discharge of the battery pack, and the like thereof. This is so, at least in part, to provide information that may be used to charge the electric aircraft with a compatible electric charging device and optimal amount of electric energy. Persons skilled in the art, upon reviewing the entirety of this disclosure, will be aware of the various battery information used for charging and purposes as described herein.

With continued reference to FIG. 1, the battery pack datum may include at least an electrical parameter which may include, without limitation, voltage, current, impedance, resistance, and/or temperature. The current may be measured by using a sense resistor in series with the circuit and measuring the voltage drop across the resister, or any other suitable instrumentation and/or methods for detection and/or measurement of current. The voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. For example and without limitation, the battery pack datum may include a voltage of the battery pack of electric aircraft 136 to be 800 volts while second battery pack. In another non-limiting example, the battery pack datum may include a current of the battery pack of electric aircraft 136 to be 200 kWh. In a non-limiting embodiment, the battery pack datum may include a temperature datum. A "temperature datum," for the purposes of this disclosure, is any datum or element of data describing the temperature of a battery pack. Temperature datum may include a heating parameter and a cooling parameter. Heating parameter may include a rate of temperature increase of the battery pack. Cooling parameter may include a rate of temperature decrease of a battery pack. For example and without limitation, temperature datum may include a temperature of 60 to 80 degrees Fahrenheit. For example and without limitation, cooling parameter may include a temperature of a battery to be any temperature below 40 degrees Fahrenheit. For example and without limitation, heating parameter may include a temperature of a battery to be any temperature above 200 degrees Fahrenheit. Persons skilled in the art, upon reviewing the entirety of this disclosure, will be aware of the various data surrounding the battery of an electric aircraft for purposes as described herein.

With continued reference to FIG. 1, sensor datum 108 may include information indicative of the location of charging connector 128 relative to electric aircraft port 140. In a non-limiting embodiment, sensor 104 may detect the proximity of electric aircraft port 140 relative to charging connector 128 of the recharging landing pad of system 100. For example and without limitation, sensor 104 disposed onto charging connector 128 may detect if electric aircraft 136 and its electric aircraft port 140 are within a certain distance for charging connector 128 to physically form a connection with electric aircraft port 140 to transfer electric energy. In another non-limiting example, sensor datum 108 may inform computing device 112 if electric aircraft 136 is too far for charging connector 128 to reach electric aircraft port 140 of electric aircraft 136, wherein computing device 112 may generate an alert to inform any personnel or electric aircraft 136 of the situation. Persons skilled in the art, upon reviewing the entirety of this disclosure, will be aware of the various embodiments of proximity data for accurate and safe charging and connection for purposes as described herein.

With continued reference to FIG. 1, sensor datum 108 may include a battery parameter set. A "battery parameter set," for the purpose of this disclosure, is an element of data representing physical values and/or identifiers of an electric aircraft, the electric aircraft's actuators and/or flight components, and the electric aircraft's charging components. For instance and without limitation, the battery parameter set may be consistent with the battery parameter set in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. For example and without limitation, electric aircraft 136 may generate its own battery parameter set in which the pilot of electric aircraft 136 may transmit the battery parameter set to computing device 112, which may be first received and/or detected by sensor 104, through any means of digital communication, which may include being connected to a network, in order for computing device 112 to generate charging instruction set 120 for electric aircraft 136 and provide charging of electric aircraft 136 and its battery. This is so, at least in part, to provide computing device 112 useful information in generating charging instruction set 120 tailored to electric aircraft 136 or to any other electric aircraft.

With continued reference to FIG. 1, the battery parameter set may include a datum including battery parameters. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor may include circuitry, computing devices, electronic components or a combination thereof that translates any datum into at least an electronic signal configured to be transmitted to another electronic component. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The battery parameter set may include a plurality of individual battery parameters. A "battery parameter," for the purposes of this disclosure, refers to a measured value associated with electric aircraft 136 and its battery pack. Battery parameter may include a state of charge of the battery pack. A "state of charge," for the purposes of this disclosure, refers to the level of charge of the electric battery relative to its capacity. Battery parameter may include a charge cycle. A "charge cycle," for the purposes of this disclosure, refers the process of charging a rechargeable battery and discharging it as required into a load. The term is typically used to specify a battery's expected life, as the number of charge cycles affects life more than the mere passage of time. A person of ordinary skill in the art, after viewing the entirety of this disclosure, would appreciate the plurality of measured values in the context of battery charging.

With continued reference to FIG. 1, the battery parameter set may include at least a charge requirement. A "charge requirement, for the purpose of this disclosure, refers to an element of data representing physical or electronic values that identify compatible parameters for charging. The at least charge requirement may include, but not limited to, battery capacity of the electric aircraft, battery charge cycle, maximum battery capacity, minimum battery capacity, and the like thereof. The at least a charge requirement may include a plurality of maximum charge current for a plurality of battery types. In a non-limiting embodiment, charge requirement may include a minimum charge current to be 15% to 25% of the maximum battery capacity of a battery pack of electric aircraft 136. In a non-limiting embodiment, the at least a charge requirement may include a maximum charging current to be 50% for a gel battery, 50% for an AGM battery and the like thereof. In a non-limiting embodiment, the at least a charge requirement may include a plurality of different types of chargers designated for different types of electric aircrafts, different types of electric aircraft batteries, and different types of charging.

With continued reference to FIG. 1, in a non-limiting embodiment, the at least charge requirement may include a classification label for type of charger to be used on a battery pack in which the battery pack is assigned a classification label based on the quality of life of the battery pack. For example and without limitation, electric aircraft 136 with a low level classification level may denote a level 1 charger to be used which may be included in the battery parameter set. For instance, a battery pack with a degraded quality of life and/or smaller capacitive load may be designated a level 1 charger configured to slowly charge the battery pack to avoid exposure to high electric current that may lead to considerable stress or damage to the battery pack and electric aircraft 136. For example and without limitation, the battery pack may be designated to a low level classification label as a function of the priority of the charging of the electric aircraft. In a non-limiting embodiment, the battery parameter set may include information regarding the type of travel of an electric aircraft. For example and without limitation, if electric aircraft 136 is intended to fly a low priority flight, the battery parameter set may denote a low level classification label to the electric aircraft 136 in which a level 1 charger may be assigned to charge electric aircraft 136. For example and without limitation, the at least a charge requirement of the battery parameter set for electric aircraft 136 may include a charge duration of 40 hours. In a non-limiting embodiment, a battery pack of electric aircraft 136 may be classified with an average level classification label and denote the use of a level 2 charger. For example and without limitation, electric aircraft 136 intended for a long flight may denote a level 2 charger and average level classification label in which the battery parameter set may denote such information and designate a level 2 charger to better charge the electric aircraft 136 as a result of the battery parameter set. For example and without limitation, the battery parameter set denoting an average level classification label may include the at least a charge requirement containing a charge rate of 6 kW. In a non-limiting embodiment, the battery parameter set for electric aircraft with an average level classification label may include a charge duration of 6 hours. In a non-limiting embodiment, a high level classification label may be assigned to an electric aircraft 136 and denote a level 5 charger for high priority flights. In a non-limiting embodiment, a high level classification label may be assigned to electric aircraft 136 with a battery pack containing a high capacitive load which may endure fast electrical current. For example and without limitation, electric aircraft 136 that may be intended to fly important persons or emergency flights may denote a high level classification label in which the battery parameter set may assign the electric aircraft to a level 5 charger for fast charging of electric aircraft 136. For example and without limitation, High level classification label may include the at least a charge requirement containing a charge rate of 50-60 kW. In a non-limiting embodiment, the battery parameter set for an electric aircraft with a high level classification label may include a charge duration of 2 hours. A person of ordinary skill in the art, after viewing the entirety of this disclosure, would appreciate the charge requirement identifying an electric aircraft in the context of batteries.

With continued reference to FIG. 1, the battery parameter set further includes at least a charging parameter. A "charging parameter," for the purposes of this disclosure, refers to a measured value associate with the charging of a power source of an electric aircraft. At least a charging parameter may include any data associated with charging of the battery of an electric aircraft. For example and without limitation, at least a charging parameter may include a target charge voltage for the battery, battery capacity, maximum charging time, and the like. In a non-limiting embodiment, charging parameter may include a classification label as described in the entirety of this disclosure. In a non-limiting embodiment, charging parameter may include a plurality of data describing battery parameters including, but not limited to, battery type, battery life cycle, and the like thereof. For example and without limitation, battery parameter may include a life cycle of 5 years. For example and without limitation, battery parameter may include battery types such as, but not limited to, lead acid, nickel cadmium (NiCd), nickel-metal hydride (Ni-MH), lithium-ion/lithium polymer, lithium metal, and the like thereof. In a non-limiting embodiment, battery parameter may include a plurality of threats associated with a battery pack. For example and without limitation, the battery parameter set may include threats such as, but not limited to, battery leakage, battery overcharging, excessive battery charging rate, excessive battery discharge rate, battery bus fault, and the like thereof.

With continued reference to FIG. 1, the battery parameter set further includes at least a cooling parameter. A "cooling parameter," for the purposes of this disclosure, refers to a measured value associated with the health status of the battery after charging. The at least a cooling parameter may include any data associated with cooling the battery after charging. For example and without limitation, the at least a cooling parameter may include target temperature, maximum cooling time, minimum cooling time, any data associated with the flight plan, such as destination, payload size, etc., any data associated with the aircraft metrics, such as weight, size, etc., any data associated with the exterior weather, such as air pressure, humidity, and the like. In a non-limiting embodiment, the at least cooling parameter may include a charge process and a discharge process. For example and without limitation, charge process may include a charge process rate of 1/1 degrees Celsius, charge process temperature rise of 12.57 degrees Celsius, charge process heating power of 5.42 W, and the like thereof. For example and without limitation, discharge process may include a discharge process rate of 1 degrees Celsius, a discharge process temperature rise of 15.28 degrees Celsius a discharge process heating power of 4.60 W, and the like thereof. Persons skilled in the art, upon reviewing the entirety of this disclosure, will be aware of the various parameters of thermodynamics with the at least a cooling parameter consistent with this disclosure.

With continued reference to FIG. 1, a "charging connector," for the purpose of this disclosure, is any physical connector used as a hub of transfer for electrical energy which may include a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. In a non-limiting embodiment, charging connector 128 may connect to the electric aircraft 136 via electric aircraft port 140. An "electric aircraft port," for the purpose of this disclosure, is an interface configured to mate with a connector for transferring electrical energy. For example and without limitation, sensor 104 may be attached onto charging connector 128 to better detect location relativity of connection charger 128 to electric aircraft port 140. In a non-limiting embodiment, charging connector 128 may mate with electric aircraft port 140 as a function of sensor 104 disposed onto charging connector 128 and forming a physical link.

With continued reference to FIG. 1, sensor 104 may be configured to transmit any datum detected such as, but not limited to, sensor datum 108, to computing device 112. In a non-limiting embodiment, computing device 112 may be connected to a network. A "network, for the purpose of this disclosure, is any medium configured to facilitate communication between two or more devices. The network may include, but not limited to, an artificial neural network, wireless network, radio network, electrical network, broadcast network, and the like thereof. In a non-limiting embodiment, the network may be a public network in which any electric aircraft that may fly within its range may be informed of the recharging station. In another non-limiting embodiment, a plurality of electric aircrafts that fly within the range of the network may be aware of each other's location and communicate via the network using any means of connection such as Wi-Fi, Bluetooth, radio transmission, and the like thereof. In a non-limiting embodiment, the network may be a private network in which the electric aircraft must request access to connect to the network and access the recharging station or other electric aircrafts that are within the network. In a non-limiting embodiment, the network may include a mesh network. The mesh network may include an avionic mesh network. The mesh network may include, without limitation, an avionic mesh network. For instance and without limitation, the avionic mesh network may be consistent with the avionic mesh network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In some cases, the network may communicate encrypted data. As used in this disclosure, "encrypted data" is any communicable information that is protected or secured by any method, including obfuscation, encryption, and the like. Encrypted data may include information protected by any cryptographic method described in this disclosure. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In a non-limiting embodiment, computing device 112 may receive datum from an airborne electric aircraft that is connected to the network and/or within the range of the network. For example and without limitation, electric aircraft 136 that comes within the range of the network may digitally transmit data about the aircraft and its battery recharging needs. This is so, at least in part, for computing device 112 to generate charging instruction set 120 in advanced before electric aircraft 136 descends for recharging purposes. Persons skilled in the art, upon reviewing the entirety of this disclosure, will be aware of the various digital communication and transmissions used for the purpose described herein.

With continued reference to FIG. 1, computing device 112 may receive and/or detect a plurality of information regarding one or more electric aircrafts in the sky that are within the network's radius. For example and without limitation, sensor 104 may capture information from any electric aircraft that comes within the range of the network in which computing device 112 may permit the transfer of data between computing device 112 and the electric aircraft. In a non-limiting example, the data may include a request to descend and receive recharging. Computing device 112 may authenticate electric aircraft 136. In a non-limiting embodiment, once electric aircraft 136 is in range of the network, electric aircraft 136 may request to recharge and/or computing device 112 may verify electric aircraft 136 in which recharging may be permitted. In a non-limiting embodiment, computing device 112 may authenticate any electric aircraft such as electric aircraft 136 which may come within the reach of the network using authentication module 116. An "authentication module," for the purpose of this disclosure, is a hardware and/or software module configured to authenticate an electric aircraft. In a non-limiting embodiment, once computing device 112 has established a connection with electric aircraft 136, via the network or any radio frequency or Bluetooth connection. In a non-limiting embodiment, authentication may be performed automatically via authentication module 116. In a non-limiting embodiment, authentication may be performed manually between operators of both devices through radio transmissions. Persons skilled in the art, upon reviewing the entirety of this disclosure, will be aware of the various purposes and methods of authenticating a second party as disclosed in the entirety of this disclosure.

With continued reference to FIG. 1, computing device 112 may be configured to receive a credential associated with an incoming aircraft such as electric aircraft 136. In a non-limiting embodiment, electric aircraft 136 may require recharging in which the recharging station may provide electrical energy and recharge electric aircraft 136. In a non-limiting embodiment, electric aircraft 136 may include and/or incorporate a user device. A "user device," for the purpose of this disclosure, is a computing device used by a user to communicate and/or control other computing devices such as electric aircraft 136. For example and without limitation, a pilot may interact with the user device of electric aircraft 136 to communicate with computing device 112 and/or the network. In a non-limiting embodiment, computing device 112 may be configured to compare the credential from user device to an authorized credential stored within an authentication database, and bypass authentication for user device based on the comparison of the credential from user device to the authorized credential stored within the authentication database. A "credential" as described in the entirety of this disclosure, is any datum representing an identity, attribute, code, and/or characteristic specific to a user, a user device, and/or an electric aircraft. For example and without limitation, the credential may include a username and password unique to the user, the user device, and/or the electric aircraft. The username and password may include any alpha-numeric character, letter case, and/or special character. As a further example and without limitation, the credential may include a digital certificate, such as a PKI certificate. The user device and/or the electric aircraft may include an additional computing device, such as a mobile device, laptop, desktop computer, or the like; as a non-limiting example, the user device may be a computer and/or smart phone operated by a pilot-in-training at an airport hangar. The user device and/or electric aircraft may include, without limitation, a display in communication with computing device 112; the display may include any display as described in the entirety of this disclosure such as a light emitting diode (LED) screen, liquid crystal display (LCD), organic LED, cathode ray tube (CRT), touch screen, or any combination thereof. Output data from computing device 112 may be configured to be displayed on user device using an output graphical user interface. An output graphical user interface may display any output as described in the entirety of this disclosure. Further, authentication module 116 and/or computing device 112 may be configured to receive a credential from an instructor device. The instructor device may include any additional computing device as described above, wherein the additional computing device is utilized by and/or associated with a certified flight instructor. As a further embodiment, authentication module 116 and/or computing device 112 may be configured to receive a credential from an admin device. The admin device may include any additional computing device as described above in further detail, wherein the additional computing device is utilized by/associated with an employee of an administrative body, such as an employee of the federal aviation administration.

With continued reference to FIG. 1, computing device 112 may be configured to generate charging instruction set 120 as a function of sensor datum 108. A "charging instruction set," for the purpose of this disclosure, is an operational direction on implementation of charging or recharging for electric aircrafts. In a non-limiting embodiment, charging instruction set 120 may include a pre-charge function. A "pre-charge function," for the purposes of this disclosure, refers to a stream of voltage curated by some functional requirement. Pre-charge function may include a determination on whether the charging station has the capability to provide recharge to the electric aircraft based on the battery parameters transmitted. The charging capability may include a boolean determination such as a go/no go methodology. A "go/no go methodology," for the purposes of this disclosure, refers to a pass/fail test principle using binary classification. In a non-limiting embodiment, go/no go methodology may include a plurality of binary tests to identify and/or a voltage requirement of a battery pack of an electric aircraft 136. For instance, binary tests may include pass/fail tests identifying type of battery, type of electric aircraft/vehicle, maximum and minimum battery capacities, maximum and minimum cooling temperature capacities, and the like thereof. In a non-limiting embodiment, pre-charge function may include a charge cycle wherein the charge cycle is optimized for charging an electric aircraft's battery pack via the charger. The optimized charge cycle may be determined with considerations of a charging connector's 136 battery pack as it is being powered by an electric grid. Pre-charge function may include a charger requirement for charging an electric aircraft such as a trickle charge rate, smart charge rate, rapid charge rate, and the like thereof. The pre-charge function may include the at least a charge requirement identifying the specific charger to be used to charge an electric aircraft.

With continued reference to FIG. 1, computing device 112 may be configured to generate a machine-learning model, wherein the machine-learning model is configured to receive sensor datum 108 as an input and output charging instruction set 120 as a function of a training data. In a non-limiting embodiment, the training data may be retrieved from charge instruction database 144. The training data may include an element of sensor data correlated to an element of charging instruction set. For example and without limitation, the element of sensor data may include the battery pack 136 at 30% remaining electric energy and a battery pack model that is several models older than the most current model version. The correlated element of charging instruction set may include a requirement of trickle charging the battery pack for a duration of thirty minutes to mitigate a degradation of the battery pack and cap the charging of the battery pack no more than 99%. In a non-limiting embodiment, the training data may be inputted by any user and/or be recorded into charge instruction database 144 during past charging processes. This is so, at least in part, to create a robust database. Persons skilled in the art, upon reviewing the entirety of this disclosure, will be aware of the various charging processes associated with various battery pack states for purposes as described herein.

With continued reference to FIG. 1, a "charge instruction database," for the purpose of this disclosure, is a data storage system configured to store any datum received and/or generated by computing device 112 that may be used to generate charging instruction set 120. Charge instruction database 144 may be implemented, without limitation, as a relational database, a key-value retrieval database such as a NOSQL database, or any other format or structure for use as a database that a person skilled in the art would recognize as suitable upon review of the entirety of this disclosure. Charge instruction database 144 may alternatively or additionally be implemented using a distributed data storage protocol and/or data structure, such as a distributed hash table and the like. Charge instruction database 144 may include a plurality of data entries and/or records, as described above. Data entries in charge instruction database 144 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

With continued reference to FIG. 1, charge instruction database 144 may organize data according to one or more instruction tables. One or more charge instruction database 144 tables may be linked to one another by, for instance in a non-limiting example, common column values. For instance, a common column between two tables of charge instruction database 144 may include an identifier of a submission, such as a form entry, textual submission, accessory device tokens, local access addresses, metrics, and the like, for instance as defined herein; as a result, a search by a computing device 112 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. In a non-limiting embodiment, computing device 112 may store and/or retrieve machine-learning models, classifiers, among other determinations, I/O data, heuristics, algorithms, and the like, from charge instruction database 144. In a non-limiting embodiment, charge instruction database 144 may include a cloud database that may be only accessible via a connection with the network. In a non-limiting embodiment, charge instruction database 144 may include a plurality of data tables, such as a sensor datum table. A "sensor datum table," for the purpose of this disclosure in some cases, is a collection of sensor datum 108 received from a plurality of previous instances and a plurality of electric aircrafts. The sensor datum table may store any sensor datum 108 received by computing device 112. In a non-limiting embodiment, computing device 112 may retrieve a sensor datum from the sensor datum table to generate a training set in order to train the machine-learning model to generate charging instruction set 120. Charge instruction database 144 may include a charging instruction table. A "charging instruction table," for the purpose of this disclosure, is a is a collection of charging instruction set 120 generated from a plurality of previous instances and a plurality of electric aircrafts. In a non-limiting embodiment, computing device 112 may store any charging instruction set 120 generated by computing device 112 and/or the machine-learning model into the charging instruction table. Charge instruction database 144 may include a safety lock instruction table. A "safety lock instruction table," for the purpose of this disclosure, is a collection of safety lock instructions generated from a plurality of previous instances and a plurality of electric aircrafts, which may be used for generating a training set used to train the machine-learning model. In a non-limiting embodiment, the charging instruction table may include categorized identifying data, as described above, including battery data, battery capacity data, state of charge data, target voltage data, charge cycle data, charging time data, and the like. One or more tables may include a cooling parameter table, which may include data regarding target temperature, cooling/heating time, thresholds, scores, metrics, values, categorizations, and the like, that a controller 124 may use to calculate, derive, filter, retrieve and/or store battery parameter sets 128, identifiers related with cohorts of users, and the like. One or more tables may include flight plan table, which may include data destination, departing location, cargo size, aircraft metrics, aircraft logistics, and the like thereof, one or more tables may include a pre-charge function table, which may include a plurality of unique pre-charge functions for different electric vehicle/aircraft types and/or different battery types for generation or determining a pre-charge function to be applied in recharging the electric vehicle/aircraft. One or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein.

With continued reference to FIG. 1, charge instruction database 144 may include a flight plan table, a pre-charge function table, and/or heuristic table. Determinations by a machine-learning process, machine-learning model, ranking function, and/or classifier, may also be stored and/or retrieved from the charge instruction database 144. A "flight plan table," for the purpose of this disclosure, is a is a collection of flight plans that may be received as a part of sensor datum 108 from a plurality of previous instances and a plurality of electric aircrafts. In a non-limiting embodiment, computing device 112 may generate a training set using a flight plan from the flight plan table which may, at least in part, generate charging instruction set 120 based on the flight plan of an electric aircraft. a "pre-charge function table," for the purpose of this disclosure, is a is a collection of pre-charge functions generated from a plurality of previous instances and a plurality of electric aircrafts. In a non-limiting embodiment, computing device 112 may retrieve a pre-charge function from the pre-charge function table to generate, at least in part, a training set for the machine-learning model. As a non-limiting example, charge instruction database 144 may organize data according to one or more instruction tables. One or more charge instruction database 144 tables may be linked to one another by, for instance in a non-limiting example, common column values. For instance, a common column between two tables of charge instruction database 144 may include an identifier of a submission, such as a form entry, textual submission, accessory device tokens, local access addresses, metrics, and the like, for instance as defined herein; as a result, a search by a controller 124 may be able to retrieve all rows from any table pertaining to a given submission or set thereof. Other columns may include any other category usable for organization or subdivision of data, including types of data, names and/or identifiers of individuals submitting the data, times of submission, and the like. Persons skilled in the art, upon reviewing the entirety of this disclosure, will be aware of various ways in which data from one or more tables may be linked and/or related to data in one or more other tables.

With continued reference to FIG. 1, computing device my use a training set retrieved from charge instruction database which may be used to train the machine-learning model in generating charging instruction set 120. In a non-limiting embodiment, the training set may include any datum retrieved from charge instruction database 144. In a non-limiting embodiment, the training set may correlate a sensor data correlated to a charging instruction set. A "sensor data," for the purpose of this disclosure in some cases, is any sensor datum or collection of sensor datum from previous instances of sensor 104 detecting any data from a plurality of electric aircrafts. A "charging instruction set data," for the purpose of this disclosure, is any charging instruction set information or charging instruction set information from previous instances of generating the charging instruction from past electric aircrafts. For example and without limitation, the training set may include a previously measured sensor datum correlated to a previously generated charging instruction set that closely matches the input of the current sensor datum 108 detected. In another non-limiting example, the training data may include a sensor datum retrieved from the sensor datum table correlated to a safety lock instruction from the safety lock instruction table. Persons skilled in the art, upon reviewing the entirety of this disclosure, will be aware of the various embodiments for the training data used in training a machine-learning model for purposes as described herein.

With continued reference to FIG. 1, charging instruction set 120 may include safety lock instruction 124. A "safety lock instruction," for the purpose of this disclosure, is a safety feature and an operational direction or implementation for charging connector 128 and any locking mechanism it may have. In a non-limiting embodiment, safety lock instruction set 120 may be generated as a function of a second machine-learning model. For example and without limitation, computing device 112 may retrieve a training set containing at least a previous instance of a safety lock instruction from the safety lock instruction table for training the machine-learning model in generating safety lock instruction 124 of charging instruction set 120 for electric aircraft 136. The training set may include an element of charging instruction set correlated to an element of safety lock instruction set. For example and without limitation, an element of charging instruction set may include a requirement that a charging duration must be uninterrupted for thirty minutes. The correlated element of instruction set to the requirement may include an action of locking the fastener of the charging connector for at least thirty minutes and the duration of the charging. In another non-limiting example, an element of charging instruction set may include a requirement that a charging may not begin unless a connection is established. The correlated element of instruction set for the requirement may include locking the fastener of the charging connector closed until a proximity sensor detects an electric aircraft port to be connected to in which the fastener may open and lock in place after a connection is established. The safety lock instruction may vary depending on the specific charging instruction set for the electric aircraft. In a non-limiting embodiment, safety lock instruction 124 may include a feature that may control, whether or not charging (or current flow) should be enabled, disabled, modified, regulated, or the like. For example and without limitation, safety lock instruction 124 include an initial security measure to verify a physical connection between charging connector 128 and electric aircraft 136 and/or electric aircraft port 140 is established. In another non-limiting example, safety lock instruction 124 may include a feature that ensures no current flow is occurring between charging connector 128 and electric aircraft 136 or electric aircraft port 140. Safety lock instruction 124 may include specific instructions that may instruct any locking mechanism within charging connector 128 to block any transfer of electrical energy between charging connector 128 and electric aircraft 136. For example and without limitation, safety lock instruction 124 may include instructions for computing device 112 and/or charging connector 128, which may be electrically connected with computing device 112, to lock fastener 132 to ensure no flow of electrical energy is occurring as long as charging connector 128 is not mated with electric aircraft 136 and/or electric aircraft port 140. In a non-limiting embodiment, computing device 112 and/or charging connector 128 may unlock fastener 132 to ensures that there is a flow of electrical energy between charging connector 128 and electric aircraft port 140. In a non-limiting embodiment, safety lock instruction 124 may include a feature that ensure fastener 132 is locked indefinitely without interruption, until the performance of the charging instruction is complete. Persons skilled in the art, upon reviewing the entirety of this disclosure, will be aware of the various safety features for controlling a fastener for purposes as described herein.

With continued reference to FIG. 1, safety lock instruction 124 may include a feature that blocks out any transfer of electrical energy from electric aircraft 136 to charging connector 128. In a non-limiting embodiment, charging connector 128 may be supplied by a battery storage system of the recharging station. A "battery storage system," for the purpose of this disclosure, is a system or power bank that is used to provide electrical charge to electric aircrafts and is itself supplied by an electric grid. For instance and without limitation, the battery storage system may be consistent with the battery storage system in U.S. patent application Ser. No. 17/373,863 and title, "SYSTEM FOR CHARGING FROM AN ELECTRIC VEHICLE CHARGER TO AN ELECTRIC GRID," which is incorporated herein in its entirety. In a non-limiting embodiment, safety lock instruction 124 may include a feature incorporating a timer that is configured to automatically lock out electric aircraft 136 from charging connector 128 after the timer runs out. For example and without limitation, charging instruction set 120 may include instructions to provide charge to electric aircraft 136 for exactly ten minutes, in which after the ten minutes expires, fastener 132 is instructed to block out any ports of charging connector 128 and ultimately disconnecting charging connector 128 from electric aircraft port 140. This is so, at least in part, to minimize overcharging the battery pack of electric aircraft 136 and/or minimizing any waste of electrical energy. In a non-limiting embodiment, safety lock instruction may include a feature that provides a specific amount of electrical energy to be allocated to electric aircraft 136 for charging, wherein once the charge amount is completed, faster 132 is instructed to lock charging connector 128 and disconnect itself from electric aircraft port 140. In a non-limiting embodiment, safety lock instruction 124 may include a feature to minimize battery degradation of the battery pack of electric aircraft 136. For example and without limitation, if the battery pack of electric aircraft 136 is down to about 80% of their capacity, which may result in impaired energy delivery and increased internal resistance, the 20% reduction of capacity means providing 20% increase charge relative to the battery pack in which computing device 112 may allocate the required amount as a function of safety lock instruction 124 which is to cater for this deterioration. This also helps with the longevity of the battery pack. In another non-limiting embodiment, safety lock instruction 124 is configured to ensure the battery packs of electric aircrafts last long, which may include generating a requirement that a full charge is to be avoided or to completely empty the battery pack of an electric aircraft in a bidirectional charging event. Persons skilled in the art, upon reviewing the entirety of this disclosure, will be aware of the various safety measures for purposes as described herein.

With continued reference to FIG. 1, safety lock instruction 124 may include a feature to lock out charging connector 128 and block out electrical energy flow to interrupt the charging of the electric aircraft as a function of a monetary factor. A "monetary factor," for the purpose of this disclosure, is a pre-determined monetary value that an electric aircraft is allowing to be considered in the charging of the electric aircraft. For example and without limitation, electric aircraft 136 may provide information as to recharging the battery pack relative to a specific monetary amount. Safety lock instruction 124 may instruct charging connector 128 to halt charging electric aircraft 136 after the allocated amount of electrical energy for the paid amount is completed. In a non-limiting embodiment, safety lock instruction 124 may include a feature that opens fastener 132 and locks it in place so that it cannot be interrupted during the process of charging electric aircraft 136. In another non-limiting embodiment, safety lock instruction 124 may include locking fastener 132 in place in the event of any transfer of electrical energy to prevent any interruptions to the flow of electrical energy. Persons skilled in the art, upon reviewing the entirety of this disclosure, will be aware of the various embodiments of safety features with pre-paid monetary factors for purposes as described herein.

With continued reference to FIG. 1, in a non-limiting embodiment, computing device 112 may generate charging instruction set 120 once a connection between charging connector 128 and electric aircraft port 140 is established. For example and without limitation, once the connection is established, sensor 104 may be able to detect and measure specific qualitative and quantitative data regarding electric aircraft 136 and its battery pack. For example, charging connector 128 may determine the specific charger to be used as a function of the pre-charge function in which computing device 112 may configure the charger, which may comprise a plurality of different types of chargers, to unlock the specific charger identifying by the charger requirement of the pre-charge function an aircraft may use to charge the battery pack of the aircraft. Computing device 112 may generated safety lock instruction 124 as a function of the established connection. In a non-limiting embodiment, safety lock instruction may include a feature that decides whether or not charging (or current flow) should be enabled, disabled, modified, regulated, or the like. In a non-limiting embodiment, computing device 112 may recognize that electric aircraft 136 may be an unapproved vehicle as a function of authentication module 116 and generate safety lock instruction 124 to lock out charging connector 128 from unapproved electric aircraft 136.

With continued reference to FIG. 1, for instance and without limitation, charging connector 128 may be consistent with the charging connector in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. Charging connector 128 may include a housing. As used in this disclosure, a "housing" is a physical component within which other internal components are located. In some cases, internal components with housing will be functional while function of housing may largely be to protect the internal components. Housing and/or connector may be configured to mate with a port, for example an electric aircraft port 140. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of charging connector 128. In some cases, mate may be lockable. As used in this disclosure, an "electric vehicle" is any electrically power means of human transport, for example without limitation an electric aircraft or electric vertical take-off and landing aircraft. In some cases, an electric vehicle will include a battery pack configured to power at least a motor configured to move the electric aircraft 136. In a non-limiting embodiment, electric aircraft port 140 may be configured to support bidirectional charging. A "bidirectional charging," for the purpose of this disclosure, is a charging that allows for the flow of electricity to go two ways. In a non-limiting embodiment, charging connector 128 may provide electric energy to the battery pack of an electric aircraft from a power source such as an electric grid and also receive electric energy from an electric aircraft and its battery pack. For example and without limitation, electric aircraft port 140 may act as a hub for the transfer of electrical energy. In a non-limiting embodiment, electric aircraft port 140 may be integrated into a system supporting vehicle-to-grid (V2G) charging. For example and without limitation, electric aircraft port may be used to transfer electric energy from the battery pack of electric aircraft 136 to charge a power source and/or battery pack of a charging connector 128. Charging connector 128 may include a universal charger and/or common charger. For example and without limitation, charging connector 128 may draw power from a variety of input voltages. Persons skilled in the art, upon reviewing the entirety of this disclosure, will be aware of various configurations of the electric aircraft port 140 that may be utilized for various charging methodologies consistent with this disclosure.

With continued reference to FIG. 1, charging connector 128 and/or housing of connector may include fastener 132. As used in this disclosure, a "fastener" is a physical component that is designed and/or configured to attach or fasten two (or more) components together. Charging connector 128 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 5M DUAL LOCK fasteners manufactured by 5M Company of Saint Paul, Minn. Press-fastener may also include adhesives, including reusable gel adhesives, GECKSKIN adhesives developed by the University of Massachusetts in Amherst, of Amherst, Mass., or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electromagnet. Fastener may be configured to provide removable attachment between charging connector 128 and at least a port, for example electric aircraft port 140. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, charging connector 128 may include a charger. A "charger," for the purposes of this disclosure, refers to an electric device that serves as a medium to provide electricity to a battery by a charge connection. The charger may include, but not limited to, a constant voltage charger, a constant current charger, a taper current charger, a pulsed current charger, a negative pulse charger, a dumb charger, a fast charger, a smart charger, an IUI charger, a bidirectional charger, a trickle charger and/or a float charger. In a non-limiting embodiment, a recharging station may be configured to support bidirectional charging as a function of the charger. Bidirectional charging may include the transfer of electrical energy that goes two ways: from an electric grid to an EV battery or from an EV battery to an electric grid. In a non-limiting embodiment, charging station may perform bidirectional charging via the connection between charging connector 128 and electric aircraft port 140. In a non-limiting embodiment, charging station may automatically connect the charger to electric aircraft port 140. In a non-limiting embodiment, the charger is mechanically coupled to a docking terminal and protruded outward for a user to manually adjust and connect to electric aircraft port 140 of electric aircraft 136. In a non-limiting embodiment, the charger may lock itself via the charging station if the connection between electric aircraft 136 and charging connector 128 is not formed or detected. For instance, the charger may be configured to remain locked and unusable unless an electric aircraft nearby requires charging and forms a charge connection. In a non-limiting embodiment, the charger may be unlocked to allow for use in the charging of an electric aircraft or the receiving of electric power from the electric aircraft when a charge connection is detected and/or formed. In a non-limiting embodiment, charger may incorporate a timer that is configured to allow for an electric aircraft to use the charger for the duration of the timer. For instance, once a charge connection is detected and/or formed and the electric aircraft is physically linked with the charger, a timer may begin to countdown in which the aircraft may utilize the charger before the timer runs out and the charger becomes locked. A person of ordinary skill in the art, after viewing the entirety of this disclosure, would appreciate the various charging capabilities that may be conducted.

With continued reference to FIG. 1, charging connector 128 may include a power converter. As used in this disclosure, a "power converter" is an electrical system and/or circuit that converts electrical energy from one form to another. For example, in some cases power converter may convert alternating current to direct current, and/or direct current to alternating current. In some cases, power converter may convert electrical energy having a first potential to a second potential. Alternative or additionally, in some cases, power converter may convert electrical energy having a first flow (i.e., current) to a second flow. As used in this disclosure, an "alternating current to direct current converter" is an electrical component that is configured to convert alternating current to digital current. An alternating current to direct current (AC-DC) converter may include an alternating current to direct current power supply and/or transformer. In some cases, the AC-DC converter may be located within electric aircraft 136 and conductors may provide an alternating current to the electric aircraft by way of at least a charger. Alternatively and/or additionally, in some cases, AC-DC converter may be located outside of electric vehicle and an electrical charging current may be provided as a direct current to electric aircraft 136, by way of at least a charger. In some cases, AC-DC converter may be used to recharge the battery pack of electric aircraft 136. In some embodiments, power converter may have a connection to a grid power component, for example by way of at least a charger. Grid power component may be connected to an external electrical power grid. In some embodiments, grid power component may be configured to slowly charge one or more batteries in order to reduce strain on nearby electrical power grids. In one embodiment, grid power component may have an AC grid current of at least 250 amps. In some embodiments, grid power component may have an AC grid current of more or less than 250 amps. In one embodiment, grid power component may have an AC voltage connection of 280 Vac. In other embodiments, grid power component may have an AC voltage connection of above or below 280 Vac. In some embodiments, charging station may provide power to the grid power component by the electric energy stored in its own battery pack of charging connector 128 or the battery pack of an electric aircraft. In this configuration, charging station may provide power to a surrounding electrical power grid.

With continued reference to FIG. 1, in some cases, the power converter may include one or more direct current to direct current (DC-DC) converters. DC-DC converters may include without limitation any of a linear regulator, a voltage regulator, a motor-generator, a rotary converter, and/or a switched-mode power supply. In some cases, power converter may include a direct current to alternating current (DC-AC) converter. DC-AC converters may include without limitation any of a power inverter, a motor-generator, a rotary converter, and/or a switched-mode power supply. In some cases, power converter may include one or more alternating current to direct current (AC-DC) converters. AC-DC converters may include without limitation any of a rectifier, a mains power supply unit (PSU), a motor-generator, a rotary converter, and/or a switched-mode power supply. In some cases, power converter may include one or more alternating current to alternating current (AC-AC) converters. AC-AC converters may include any of a transformer, autotransformer, a voltage converter, a voltage regulator, a cycloconverter, a variable-frequency transformer, a motor-generator, a rotary converter, and/or a switched-mode power supply. In some cases, power converter may provide electrical isolation between two or more electrical circuits, for example battery pack 116 and charger. In some cases, power converter may provide a potential (i.e., voltage) step-down or step-up. In some embodiments, power converter may receive an alternating current and output a direct current. In some embodiments, power converter may receive a potential within a range of about 100 Volts to about 500 Volts. In some embodiments, power converter may output a potential within a range of about 200 Volts to about 600 Volts. In some embodiments, power converter may receive a first potential and output a second potential at least as high as the first potential. In some embodiments, power converter may be configured to receive a first current from a power source including a "Level 2" charger, such that the first current consists of an alternating current having a potential of about 240 Volts or about 120 Volts and a maximum current no greater than about 30 Amps or no greater than about 20 Amps. In some embodiments, power converter may be configured to output a second current which is comparable to that output by a "Level 5" charger, such that the second current consists of a direct current having a potential in a range between about 200 Volts and about 600 Volts.

With continued reference to FIG. 1, charging connector 128 may include one or more conductors configured to conduct, for example, a direct current (DC) or an alternating current (AC), and the like thereof. In a non-limiting embodiment, the conductor may be configured to charge or recharge, for example, the battery pack of the electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor may be configured to charge and/or recharge an electric vehicle. For instance, conductor may be connected to a battery pack 116 and conductor may be designed and/or configured to facilitate a specified amount of electrical power, current, or current type. For example, a conductor may include a direct current conductor. As used in this disclosure, a "direct current conductor" is a conductor configured to carry a direct current for recharging the battery pack of electric aircraft 136. As used in this disclosure, "direct current" is one-directional flow of electric charge. In some cases, a conductor may include an alternating current conductor. As used in this disclosure, an "alternating current conductor" is a conductor configured to carry an alternating current for recharging the battery pack of electric aircraft 136. As used in this disclosure, an "alternating current" is a flow of electric charge that periodically reverse direction; in some cases, an alternating current may change its magnitude continuously with in time (e.g., sine wave). In a non-limiting embodiment, charging connector 128 may include a ground conductor. A "ground conductor," for the purpose of this disclosure, is a conductor or a system or that is intentionally grounded. In a non-limiting embodiment, the ground conductor may include any suitable conductor configured to be in electrical communication with a ground. In a non-limiting embodiment, a ground is a reference point in an electrical circuit, a common return path for electric current, or a direct physical connection to the earth. The ground may include an absolute ground such as earth or ground may include a relative (or reference) ground, for example in a floating configuration. The ground conductor functions to provide a grounding or earthing path for any abnormal, excess or stray electricity. In a non-limiting embodiment, charging connector 128 may include a control signal conductor configured to conduct a control signal. A "control signal conductor," for the purpose of this disclosure, is a conductor configured to carry a control signal between charging connector 128 and computing device 112. The control signal is an electrical signal that is indicative of information. The control signal may include, for example, an analog signal, a digital signal, or the like.

With continued reference to FIG. 1, charging connector 128 may be configured to receive an electrical charging current from a power source such as the electric grid. The electrical charging current may include any electrical charging current as described in the entirety of this disclosure. In a non-limiting embodiment, conductor may include a physical device and/or object that facilitates conduction, for example electrical conduction and/or thermal conduction. In some cases, a conductor may be an electrical conductor, for example a wire and/or cable. Exemplary conductor materials include metals, such as without limitation copper, nickel, steel, and the like. As used in this disclosure, "communication" is an attribute wherein two or more relata interact with one another, for example within a specific domain or in a certain manner. In some cases communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Figure 2:
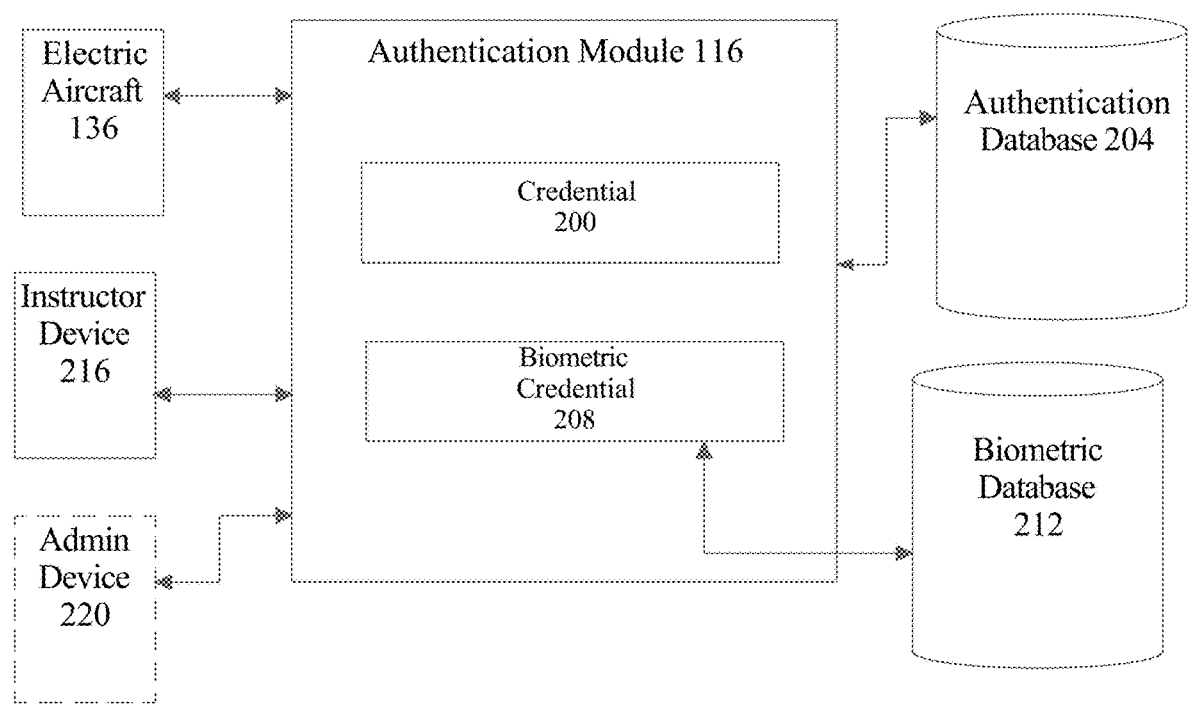
FIG. 2 is a block diagram of an exemplary embodiment of an authentication module.

Referring now to FIG. 2, an embodiment of authentication module 116, as pictured in FIG. 1, is illustrated in detail. Authentication module 128 may include any suitable hardware and/or software module. Authentication module 128 and/or computing device 112 can be configured to authenticate electric aircraft 136. Authenticating, for example and without limitation, can include determining an electric aircraft's ability/authorization to access information included in each module and/or engine of the plurality of modules and/or engines operating on computing device 112. As a further example and without limitation, authentication may include determining an instructor's authorization/ability of access to the information included in each module and/or engine of the plurality of modules and/or engines operating on computing device 112. As a further non-limiting example, authentication may include determining an administrator's authorization/ability to access the information included in each module and/or engine of the plurality of modules and/or engines operating on computing device 112. Authentication may enable access to an individual module and/or engine, a combination of modules and/or engines, and/or all the modules and/or engines operating on computing device 112. Authenticating electric aircraft 136 is configured to receive credential 200 from electric aircraft 136. Credential 200 may include any credential as described above in further detail in reference to FIG. 1. For example and without limitation, credential 200 may include a username and password unique to the user and/or electric aircraft 136. As a further example and without limitation, credential 200 may include a PKI certificate unique to the user and/or electric aircraft 136. As a further embodiment, credential 200 may be received from instructor device 216 and/or admin device 220, such that credential 200 would authenticate each instructor device 216 and admin device 220, respectively. An "instructor device," for the purpose of this disclosure, may be a user device used by an operator of the recharging station in FIG. 1. In a non-limiting embodiment, an operator may communicate with electric aircraft 136 via instructor device 216. For example and without limitation, the operator may monitor the plurality of electric aircrafts in the sky that are in range and/or connected to the network, authenticate any incoming electric aircraft, and deliver charging instruction set 120 to electric aircraft 136 using any means as described herein. In a non-limiting embodiment, the operator may be any entity that may perform the charging of electric aircraft 136, such as by connecting charging connector 128 to electric aircraft port 140 of electric aircraft 136 on the recharging landing pad of the recharging station. An "admin device," for the purpose of this disclosure, may be a user device used by an authoritative entity that oversees all electric aircrafts and operations of charging. Persons skilled in the art, upon reviewing the entirety of this disclosure, will be aware of the various embodiments for the instructor device and the admin device for purposes as described herein.

Continuing to refer to FIG. 2, authentication module 116 and/or computing device 112 may be further designed and configured to compare credential 200 from electric aircraft 136 to an authorized credential stored in authentication database 204. For example, authentication module 116 and/or computing device 112 may be configured to compare credential 200 from electric aircraft 136 to a stored authorized credential to determine if credential 200 matches the stored authorized credential. As a further embodiment, authentication module 116 and/or computing device may compare credential 200 from instructor device 216 to an authorized credential stored in authentication database 204. For example, authentication module 116 and/or computing device may be configured to compare credential 200 from instructor device 216 to a stored authorized credential to determine if credential 200 matches the stored authorized credential. As a further non-limiting example, authentication module 116 and/or computing device112 may match credential 200 from admin device 220 to an authorized credential stored in authentication database 204. For example, authentication module 116 and/or computing device may be configured to compare credential 200 from admin device 220 to a stored authorized credential to determine if credential 200 matches the stored authorized credential. In embodiments, comparing credential 200 to an authorized credential stored in authentication database 204 can include identifying an authorized credential stored in authentication database 204 by matching credential 200 to at least one authorized credential stored in authentication database 204. Authentication module 116 and/or computing device 112 may include or communicate with authentication database 204. Authentication database 204 may be implemented as any database and/or datastore suitable for use as authentication database 204 as described in the entirety of this disclosure. An exemplary embodiment of authentication database 204 is included below in reference to FIG. 3. The "authorized credential" as described in the entirety of this disclosure, is the unique identifier that will successfully authorize each user and/or electric aircraft 136 if received. For example and without limitation, the authorized credential is the correct alpha-numeric spelling, letter case, and special characters of the username and password for electric aircraft 136. Persons skilled in the art, upon reviewing the entirety of this disclosure, will be aware of various examples of authorized credentials that may be stored in the authentication database consistently with this disclosure.

Still referring to FIG. 2, authentication module 116 and/or computing device 112 is further designed and configured to bypass authentication for electric aircraft 136 based on the identification of the authorized credential stored within authentication database 204. Bypassing authentication may include permitting access to electric aircraft 136 to access the information included in each module and/or engine of the plurality of modules and/or engines operating on computing device 112. Bypassing authentication may enable access to an individual module and/or engine, a combination of modules and/or engines, and/or all the modules and/or engines operating on computing device 112, as described in further detail in the entirety of this disclosure. As a further example and without limitation, bypassing authentication may include bypassing authentication for instructor device 216 based on the comparison of the authorized credential stored in authentication database 204. As a further non-limiting example, bypassing authentication may include bypassing authentication for admin device 220 based on the comparison of the authorized credential stored in authentication database 112.

Referring now to FIG. 2, an embodiment of authentication module 116, as pictured in FIG. 1, is illustrated in detail. Authentication module 116 may include any suitable hardware and/or software module. Authentication module 116 and/or computing device 112 can be configured to authenticate electric aircraft 136. Authenticating, for example and without limitation, can include determining an electric vehicle's ability/authorization to access information included in each module and/or engine of the plurality of modules and/or engines operating on computing device 112. As a further example and without limitation, authentication may include determining an instructor's authorization/ability of access to the information included in each module and/or engine of the plurality of modules and/or engines operating on computing device 112. As a further non-limiting example, authentication may include determining an administrator's authorization/ability to access the information included in each module and/or engine of the plurality of modules and/or engines operating on computing device 112. Authentication may enable access to an individual module and/or engine, a combination of modules and/or engines, and/or all the modules and/or engines operating on computing device 112. Authenticating electric aircraft 136 is configured to receive credential 200 from electric aircraft 136. Credential 200 may include any credential as described above in further detail in reference to FIG. 1. For example and without limitation, credential 200 may include a username and password unique to the user and/or electric aircraft 136. As a further example and without limitation, credential 200 may include a PKI certificate unique to the user and/or electric aircraft 136. As a further embodiment, credential 200 may be received from instructor device 216 and/or admin device 220, such that credential 200 would authenticate each instructor device 216 and admin device 220, respectively. An "instructor device," for the purpose of this disclosure, may be a user device used by an operator of the recharging station in FIG. 1. In a non-limiting embodiment, an operator may communicate with electric aircraft 136 via instructor device 216. For example and without limitation, the operator may monitor the plurality of electric aircrafts in the sky that are in range and/or connected to the network, authenticate any incoming electric aircraft, and deliver charging instruction set 120 to electric aircraft 136 using any means as described herein. In a non-limiting embodiment, the operator may be any entity that may perform the charging of electric aircraft 136, such as by connecting charging connector 128 to electric aircraft port 140 of electric aircraft 136 on the recharging landing pad of the recharging station. An "admin device," for the purpose of this disclosure, may be a user device used by an authoritative entity that oversees all electric aircrafts and operations of charging. Persons skilled in the art, upon reviewing the entirety of this disclosure, will be aware of the various embodiments for the instructor device and the admin device for purposes as described herein.

Continuing to refer to FIG. 2, authentication module 116 and/or computing device 112 may be further designed and configured to compare credential 200 from electric aircraft 136 to an authorized credential stored in authentication database 204. For example, authentication module 116 and/or computing device 112 may be configured to compare credential 200 from electric aircraft 136 to a stored authorized credential to determine if credential 200 matches the stored authorized credential. As a further embodiment, authentication module 116 and/or computing device may compare credential 200 from instructor device 216 to an authorized credential stored in authentication database 204. For example, authentication module 116 and/or computing device may be configured to compare credential 200 from instructor device 216 to a stored authorized credential to determine if credential 200 matches the stored authorized credential. As a further non-limiting example, authentication module 116 and/or computing device112 may match credential 200 from admin device 220 to an authorized credential stored in authentication database 204. For example, authentication module 116 and/or computing device may be configured to compare credential 200 from admin device 220 to a stored authorized credential to determine if credential 200 matches the stored authorized credential. In embodiments, comparing credential 200 to an authorized credential stored in authentication database 204 can include identifying an authorized credential stored in authentication database 204 by matching credential 200 to at least one authorized credential stored in authentication database 204. Authentication module 116 and/or computing device 112 may include or communicate with authentication database 204. Authentication database 204 may be implemented as any database and/or datastore suitable for use as authentication database 204 as described in the entirety of this disclosure. An exemplary embodiment of authentication database 204 is included below in reference to FIG. 3. The "authorized credential" as described in the entirety of this disclosure, is the unique identifier that will successfully authorize each user and/or electric aircraft 136 if received. For example and without limitation, the authorized credential is the correct alpha-numeric spelling, letter case, and special characters of the username and password for electric aircraft 136. Persons skilled in the art, upon reviewing the entirety of this disclosure, will be aware of various examples of authorized credentials that may be stored in the authentication database consistently with this disclosure.

Still referring to FIG. 2, authentication module 116 and/or computing device 112 is further designed and configured to bypass authentication for electric aircraft 136 based on the identification of the authorized credential stored within authentication database 204. Bypassing authentication may include permitting access to electric aircraft 136 to access the information included in each module and/or engine of the plurality of modules and/or engines operating on computing device 112. Bypassing authentication may enable access to an individual module and/or engine, a combination of modules and/or engines, and/or all the modules and/or engines operating on computing device 112, as described in further detail in the entirety of this disclosure. As a further example and without limitation, bypassing authentication may include bypassing authentication for instructor device 216 based on the comparison of the authorized credential stored in authentication database 204. As a further non-limiting example, bypassing authentication may include bypassing authentication for admin device 220 based on the comparison of the authorized credential stored in authentication database 112.

With continued reference to FIG. 2, authentication module 116 and/or computing device 112 may be further configured to authenticate electric aircraft 136 as a function of a physical signature authentication. A "physical signature authentication," for the purpose of this disclosure, is an authentication process that determines an electric vehicle's ability to access the information included in each module and/or engine of the plurality of modules and/or engines operating on computing device 112 as a function of a physical signature credential 208. In a non-limiting embodiment, physical signature authentication, in the embodiment, includes receiving physical signature credential 208 from electric aircraft 136, comparing and/or matching physical signature credential 208 from electric aircraft 136 to an authorized physical signature credential stored in a physical signature database 212, and bypassing authentication for electric aircraft 136 based on the comparison of the authorized physical signature credential stored within physical signature database 212. Physical signature authentication employing authentication module 116 may also include authenticating instructor device 216 and/or admin device 220. Authentication module 116 and/or computing device 112 may include or communicate with physical signature database 212. Physical signature database 212 may be implemented as any database and/or datastore suitable for use as a physical signature database entirely with this disclosure. An exemplary embodiment of physical signature database 212 is provided below in reference to FIG. 2. The "physical signature credential" as used in this disclosure, is any physical identifier, measurement, and/or calculation utilized for identification purposes regarding an electric vehicle and/or its pilot. In a non-limiting embodiment, physical signature credential 208 may include, but not limited to, a physiological characteristic and/or behavioral characteristic of the pilot associated with the electric vehicle. For example and without limitation, physical signature credential 208 may include vehicle model number, vehicle model type, vehicle battery type, vehicle authority level, pilot authority level, and the like thereof. The "authorized physical signature credential" as described in the entirety of this disclosure, is unique physical signature identifier that will successfully authorize each user and/or electric aircraft 136, such that the authorized physical signature credential is the correct physical signature credential which will enable the user and/or electric aircraft 136 access to the plurality of modules and/or engines operating on computing device 112. Persons skilled in the art, upon reviewing the entirety of this disclosure, will be aware of various examples of physical signature credentials and authorized physical signature credentials that may be utilized by authentication module 116 consistently with this disclosure.

Figure 3:
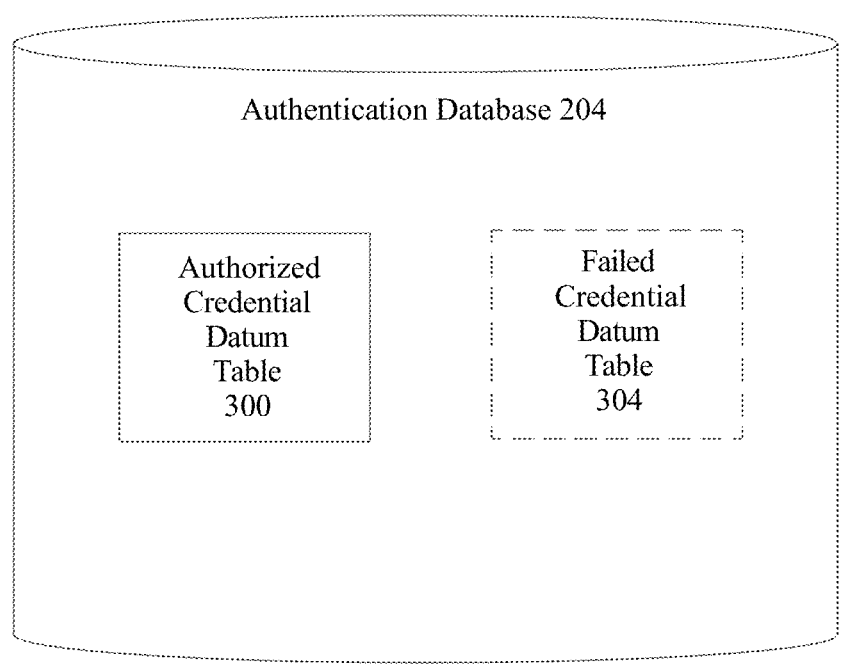
FIG. 3 is a block diagram illustrating an exemplary embodiment of an authentication database.

Referring now to FIG. 3, an embodiment of authentication database 204 is illustrated. Authentication database 204 may include any data structure for ordered storage and retrieval of data, which may be implemented as a hardware or software module. Authentication database 204 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 204 may include a plurality of data entries and/or records corresponding to credentials as described above. Data entries and/or records may describe, without limitation, data concerning authorized credential datum and failed credential datum.

With continued reference to FIG. 3, one or more database tables in authentication database 204 may include as a non-limiting example an authorized credential datum table 300. Authorized credential datum table 300 may be a table storing authorized credentials, wherein the authorized credentials may be for electric aircraft 136, instructor device 216 and/or admin device 220, as described in further detail in the entirety of this disclosure. For instance, and without limitation, authentication database 204 may include an authorized credential datum table 300 listing unique identifiers stored for electric aircraft 136, wherein the authorized credential is compared/matched to a credential 200 received from electric aircraft 136.

Still referring to FIG. 3, one or more database tables in authentication database 204 may include, as a non-limiting example, failed credential datum table 304. A "failed credential", as described in the entirety of this disclosure, is a credential received from a device that did not match an authorized credential stored within authorized credential datum table 300 of authentication database 204. Such credentials can be received from electric aircraft 136, instructor device 216 and/or admin device 220. Failed credential datum table 304 may be a table storing and/or matching failed credentials. For instance and without limitation, authentication database 204 may include failed credential datum table 304 listing incorrect unique identifiers received by a device in authentication module 116, wherein authentication of the device did not result. Tables presented above are presented for exemplary purposes only; persons skilled in the art will be aware of various ways in which data may be organized in authentication database 204 consistently with this disclosure.

Figure 4:
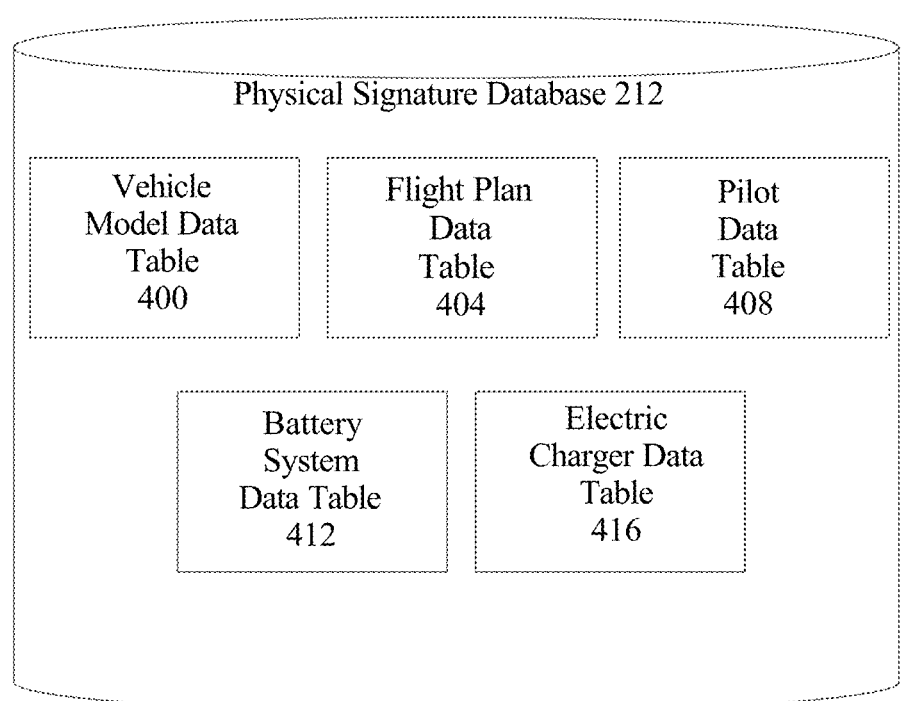
FIG. 4 is a block diagram illustrating an exemplary embodiment of a physical signature database.

Referring now to FIG. 4, an embodiment of physical signature database 212 is illustrated. Physical signature database 212 may include any data structure for ordered storage and retrieval of data, which may be implemented as a hardware or software module. Physical signature database 212 may be implemented, without limitation, as a relational database, a key-value retrieval datastore such as a NOSQL database, or any other format or structure for use as a datastore that a person skilled in the art would recognize as suitable upon review of the entirety of this disclosure. Physical signature database 212 may include a plurality of data entries and/or records corresponding to elements of physical signature datum as described above. Data entries and/or records may describe, without limitation, data concerning particular physiological characteristics and/or behavioral characteristics that have been collected. Data entries in a physical signature database 212 may be flagged with or linked to one or more additional elements of information, which may be reflected in data entry cells and/or in linked tables such as tables related by one or more indices in a relational database; one or more additional elements of information may include data associating a physical signature with one or more cohorts, including demographic groupings such as ethnicity, sex, age, income, geographical region, or the like. Additional elements of information may include one or more categories of physical signature datum as described above. Persons skilled in the art, upon reviewing the entirety of this disclosure, will be aware of various ways in which data entries in a physical signature database 212 may reflect categories, cohorts, and/or populations of data consistently with this disclosure.

Still referring to FIG. 4, one or more database tables in physical signature database 212 may include, as a non-limiting example, vehicle model data table 400. Vehicle model data table 400 may be a table correlating, relating, and/or matching physical signature credentials received from a device, such as electric aircraft 136, instructor device 216 and admin device 220, as described above, to fingerprint data. For instance, and without limitation, physical signature database 212 may include a vehicle model data table 400 listing samples acquired from an electric vehicle having allowed system 100 to retrieve data describing the make and model of the electric vehicle. The data may be retrieved by any identifier scanner that is configured to scan the shape, size, and/or any digital signature incorporated onto the electric vehicle. In a non-limiting embodiment, the electric vehicle itself may transmit the model data itself. Such data may be Referring now to FIG. 5, a flow diagram of an exemplary method 500 of a system for a safety feature for charging an electric aircraft is presented. Method 500, at step 505, may include detecting, by a sensor, a sensor datum from an electric aircraft. The sensor may include any sensor as described herein. The sensor datum may include any sensor datum as described herein. The electric aircraft may include any electric aircraft as described herein. In a non-limiting embodiment, method 500, at step 505, may include detecting the sensor datum once a connection between the electric aircraft and a charging connector is established. The connection may include any connection as described herein. The charging connector may include any charging connector as described herein. In a non-limiting embodiment, the sensor may be disposed onto the charging connector in which the connection may be a medium for the transfer of data between the electric aircraft and a computing device controlling the charging connector. For example and without limitation, the sensor datum may include useful information regarding the electric aircraft and its recharging needs in which the charging connector may use to provide electric charge best suited to the electric aircraft based on such information. Persons skilled in the art, upon reviewing the entirety of this disclosure, will be aware of the various methods of capturing data detected by a sensor and measure such data for purposes as described herein.

Figure 5:
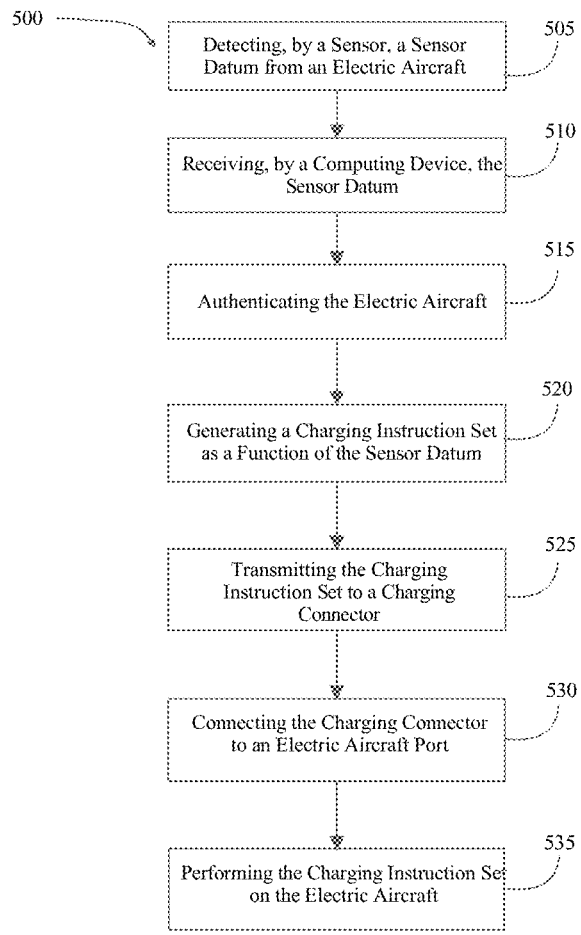
FIG. 5 is a flow diagram of an exemplary method of a system for a safety feature for charging an electric aircraft.

With continued reference to FIG. 5, method 500, at step 510, may include receiving, by a computing device, the sensor datum. The computing device may include any computing device as described herein. In a non-limiting embodiment, the computing device may be electrically connected to the electric aircraft. In a non-limiting embodiment, method 500 may include connecting to a network. The network may include any network as described herein. For example and without limitation, the computing device may receive any datum such as the sensor datum as long as it is connected to the network. In another non-limiting example, the computing device may interact or communicate with any electric aircraft within the network or in range of the network. Persons skilled in the art, upon reviewing the entirety of this disclosure, will be aware of the various methods for connecting to a network for purposes as described herein.

With continued reference to FIG. 5, method 500, at step 515, may include authenticating the electric aircraft. In a non-limiting embodiment, method 500, at step 515, may include authenticating the electric aircraft as a function of an authentication module. The authentication module may include any authentication module as described herein. In a non-limiting embodiment, authenticating the electric aircraft may include giving access to any incoming electric aircraft to the network. For example and without limitation, an electric aircraft may fly within the range of the network and wish to recharge its battery in which the authentication module may give the electric aircraft access to recharge at a recharging station of the network. In a non-limiting embodiment, method 500, at step 515, may include receiving, by an authentication module, a biometric credential from the electric aircraft, comparing the biometric credential from the electric aircraft to an authorized biometric credential stored within a biometric database and bypassing authentication for the electric aircraft based on the comparison of the biometric credential from the electric aircraft to the authorized biometric credential stored within the biometric database. The biometric credential may include any biometric credential as described herein. The biometric database may include any biometric database as described herein. In a non-limiting embodiment, the recharging station may include any recharging station as described herein. In a non-limiting embodiment, authenticating the electric aircraft may include authorizing the electric aircraft to the network and/or the recharging station for recharging purposes. For example and without limitation, authorizing the electric aircraft may include the authorizing of any communication between the electric aircraft and a computing device of the recharging station. In a non-limiting embodiment, the computing device may receive information from the electric aircraft in order to prepare a charging instruction set to recharge the electric aircraft as it descends upon the recharging station. This is so that the electric aircraft may receive its allocated amount of electric charge efficiently while reducing any excessive time wasted on the charging station. In a non-limiting embodiment, authenticating the electric aircraft may be used to provide recharging purposes to only authenticated electric aircrafts while also preventing unauthorized electric aircrafts from landing or receiving any charge. Persons skilled in the art, upon reviewing the entirety of this disclosure, will be aware of the various methods for authenticating for purposes as described herein.

With continued reference to FIG. 5, method 500, at step 520, may include generating a charging instruction set as a function of the sensor datum. The charging instruction set may include any charging instruction set as described herein.

In a non-limiting embodiment, method 500, at step 520, may include generating a machine-learning model, wherein the machine-learning model is configured to receive the sensor datum as an input and generate the charging instruction set as an output as a function of a training data. The machine-learning model may include any machine-learning model as described herein. The training data may include any training data as described herein. In a non-limiting embodiment, method 500 may include retrieving the training data from a charge instruction database. The charge instruction database may include any charge instruction database as described herein.

With continued reference to FIG. 5, method 500, at step 520, may include generating a safety lock instruction. The safety lock instruction may include any safety lock instruction as described herein. In a non-limiting embodiment, the safety lock instruction may be generated as a function of the connection made between the charging connector and the electric aircraft port. For example and without limitation, the computing device may conclude if the electric aircraft of the electric aircraft port the charging connector has made a connection with is an authorized electric aircraft or not and may include a safety feature that may be executed instantly and/or automatically and block all ports of the charging connector to the unauthorized electric aircraft. Persons skilled in the art, upon reviewing the entirety of this disclosure, will be aware of the various methods of using a safety lock for purposes as described herein.

With continued reference to FIG. 5, method 500, at step 525, may include transmitting the charging instruction set to the charging connector. In a non-limiting embodiment, transmitting the charging instruction set may include transmitting via any electrical communication methods as described herein. In a non-limiting embodiment, an operator may be present to apply the charging instruction set to the charging connector.

With continued reference to FIG. 5, method 500, a step 530, may include connecting the charging connector to an electric aircraft port. The electric aircraft port may include any electric aircraft port as described herein. In a non-limiting embodiment, connecting the charging connector may include forming a physical link between the charging connector and the electric aircraft port.

With continued reference to FIG. 5, method 500, at step 535, may include performing the charging instruction set on the electric aircraft as a function of the electric aircraft port. In a non-limiting embodiment, method 500 may include using a fastener of the charging connector to wherein the fastener is configured to enable and disable the connection of the charging connector to the electric aircraft as a function of the safety lock instruction. In a non-limiting embodiment, method 500 may include locking, by the computing device, the fastener in the event the charging connector is not connected to the electric aircraft. In another non-limiting embodiment, method 500 may include unlocking, by the computing device, the fastener in the event the charging connector is not connected to the electric aircraft. For example and without limitation, locking the fastener the method further comprises locking indefinitely without interruption, until the performance of the charging instruction is complete. Persons skilled in the art, upon reviewing the entirety of this disclosure, will be aware of the various locking and unlocking mechanisms for safety purposes as described herein.

Figure 6:
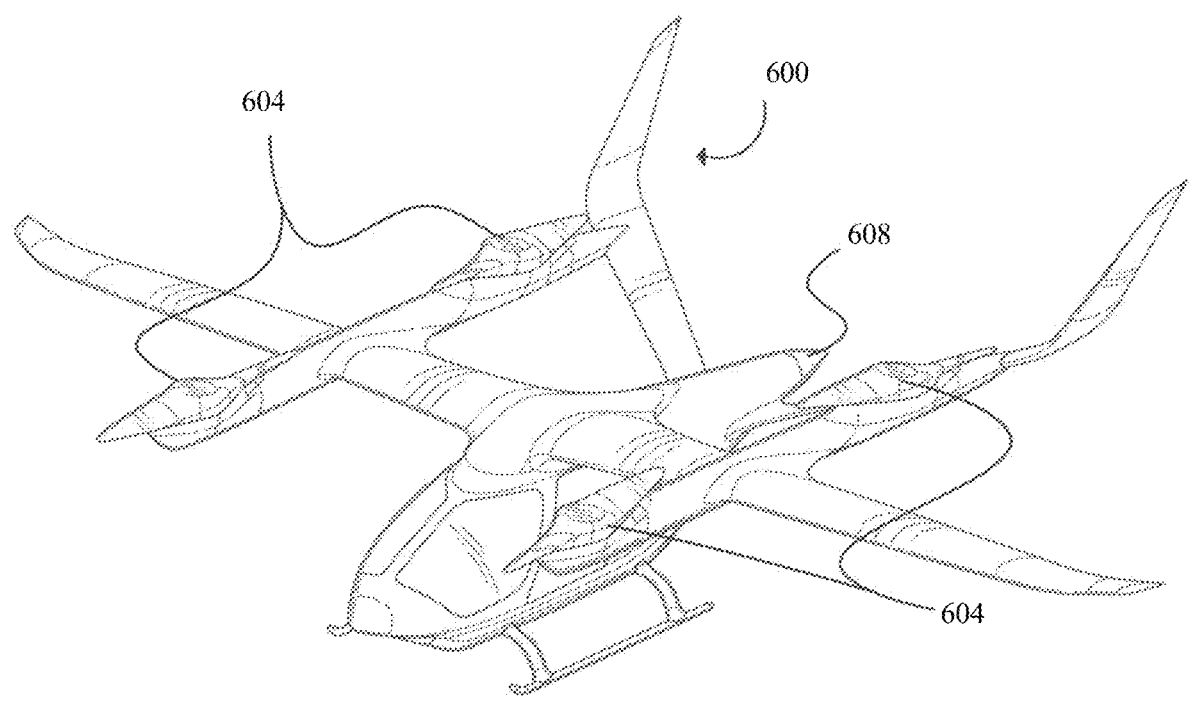
FIG. 6 is an illustration of an exemplary embodiment of an electric aircraft.

Referring now to FIG. 6, an exemplary embodiment of an aircraft 600, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 6, aircraft 600 may include an electrically powered aircraft. In embodiments, electrically powered aircraft may be an electric vertical takeoff and landing (eVTOL) aircraft. Aircraft 600 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 6.

Still referring to FIG. 6, aircraft 600 includes a fuselage 608. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 608 may include structural elements that physically support a shape and structure of an aircraft. Structural elements may take a plurality of forms, alone or in combination with other types. Structural elements may vary depending on a construction type of aircraft such as without limitation a fuselage 608. Fuselage 608 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 6, aircraft fuselage 608 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 608 orthogonal to a longitudinal (nose to tail) axis of the aircraft and may form a general shape of fuselage 608. A former may include differing cross-sectional shapes at differing locations along fuselage 608, as the former is the structural element that informs the overall shape of a fuselage 608 curvature. In embodiments, aircraft skin may be anchored to formers and strings such that the outer mold line of a volume encapsulated by formers and stringers comprises the same shape as aircraft 600 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 6, fuselage 608 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 6, fuselage 608 may include a semi-monocoque construction. Semi-monocoque construction, as used herein, is a partial monocoque construction, wherein a monocoque construction is describe above detail. In semi-monocoque construction, aircraft fuselage 608 may derive some structural support from stressed aircraft skin and some structural support from underlying frame structure made of structural elements. Formers or station frames can be seen running transverse to the long axis of fuselage 608 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 6, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 6, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 608. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 6, it should be noted that an illustrative embodiment is presented only, and this disclosure in no way limits the form or construction method of a system and method for loading payload into an eVTOL aircraft. In embodiments, fuselage 608 may be configurable based on the needs of the eVTOL per specific mission or objective. The general arrangement of components, structural elements, and hardware associated with storing and/or moving a payload may be added or removed from fuselage 608 as needed, whether it is stowed manually, automatedly, or removed by personnel altogether. Fuselage 608 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 608 may also be configurable to accept certain specific cargo containers, or a receptable that can, in turn, accept certain cargo containers.

Still referring to FIG. 6, aircraft 600 may include a plurality of laterally extending elements attached to fuselage 608. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 6, aircraft 600 includes a plurality of flight components 604. As used in this disclosure a "flight component" is a component that promotes flight and guidance of an aircraft. In an embodiment, flight component 604 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 6, plurality of flight components 604 may include at least a lift propulsor component 612. As used in this disclosure a "lift propulsor component" is a component and/or device used to propel a craft upward by exerting downward force on a fluid medium, which may include a gaseous medium such as air or a liquid medium such as water. Lift propulsor component 612 may include any device or component that consumes electrical power on demand to propel an electric aircraft in a direction or other vehicle while on ground or in-flight. For example, and without limitation, lift propulsor component 612 may include a rotor, propeller, paddle wheel and the like thereof, wherein a rotor is a component that produces torque along the longitudinal axis, and a propeller produces torquer along the vertical axis. In an embodiment, lift propulsor component 612 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 612 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or movable angle between a chord line of a blade and relative wind. As used in this disclosure a "variable angle" is an angle that is movable from an attachment point. For example, and without limitation variable angle of attack may be a first angle of 6.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 6, lift propulsor component 612 may be configured to produce a lift. As used in this disclosure a "lift" is a perpendicular force to the oncoming flow direction of fluid surrounding the surface. For example, and without limitation relative air speed may be horizontal to aircraft 600, wherein lift force may be a force exerted in a vertical direction, directing aircraft 600 upwards. In an embodiment, and without limitation, lift propulsor component 612 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 612 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 6, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 600 may be incorporated.

In an embodiment, and still referring to FIG. 6, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 6, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 6, plurality of flight components 604 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 65° from the longitudinal axis of aircraft 600. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 6, plurality of flight components 604 may include a pusher component 616. As used in this disclosure a "pusher component" is a component that pushes and/or thrusts an aircraft through a medium. As a non-limiting example, pusher component 616 may include a pusher propeller, a paddle wheel, a pusher motor, a pusher propulsor, and the like. Additionally, or alternatively, pusher flight component may include a plurality of pusher flight components. Pusher component 616 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 600 in a horizontal direction along a longitudinal axis. As a further non-limiting example, pusher component 616 may twist and/or rotate to pull air behind it and, at the same time, push aircraft 600 forward with an equal amount of force. In an embodiment, and without limitation, the more air forced behind aircraft, the greater the thrust force with which the aircraft is pushed horizontally will be. In another embodiment, and without limitation, forward thrust may force aircraft 600 through the medium of relative air. Additionally or alternatively, plurality of flight components 604 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 6, aircraft 600 may include a flight controller located within fuselage 608, wherein a flight controller is described in detail below, in reference to FIG. 6. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 60 and one or more airfoil shapes of the laterally extending elements, wherein an airfoil is described above in detail. As a further non-limiting example, flight controller may operate the fixed-wing flight capability as a function of reducing applied torque on lift propulsor component 612. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 616. For example, and without limitation, flight controller may increase a forward thrust of 1000 kN produced by pusher component 616 to a forward thrust of 1100 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 600. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 6, flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 6, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 7:
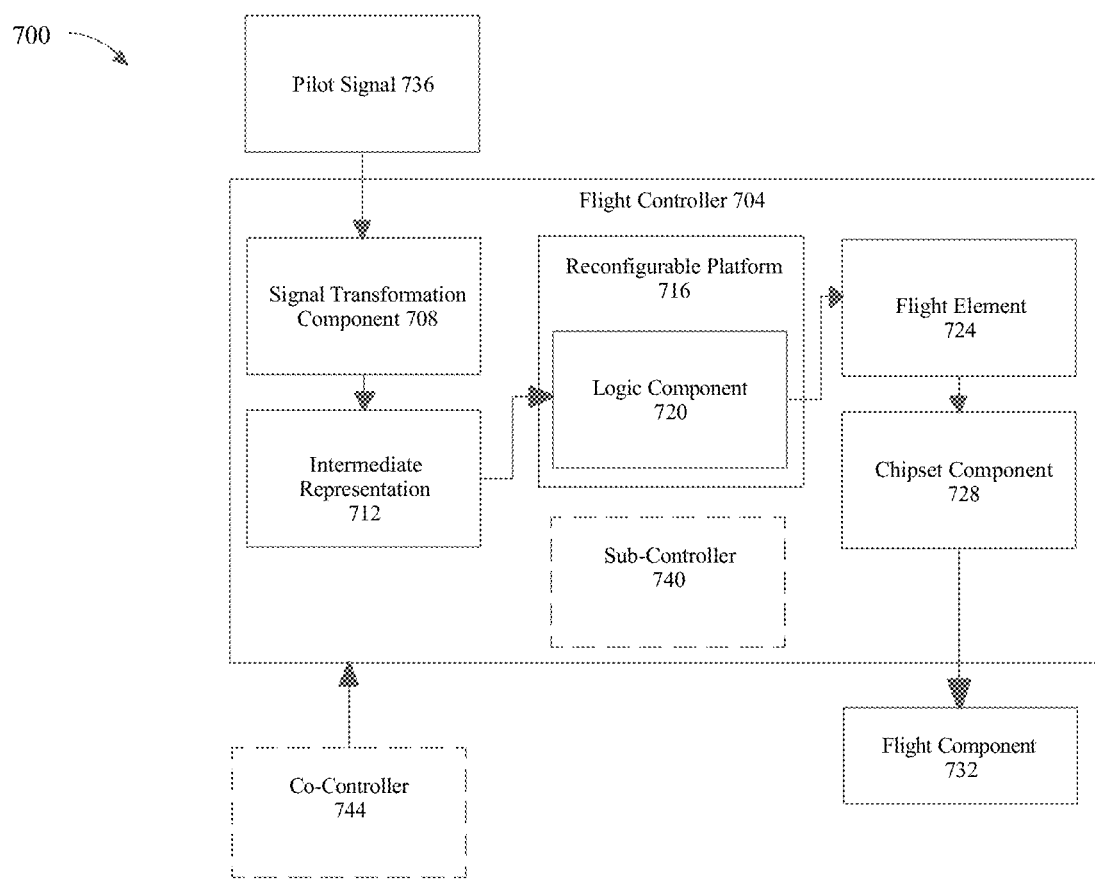
FIG. 7 is a block diagram of an exemplary flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 7-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and still referring to FIG. 7, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above. In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Figure 8:
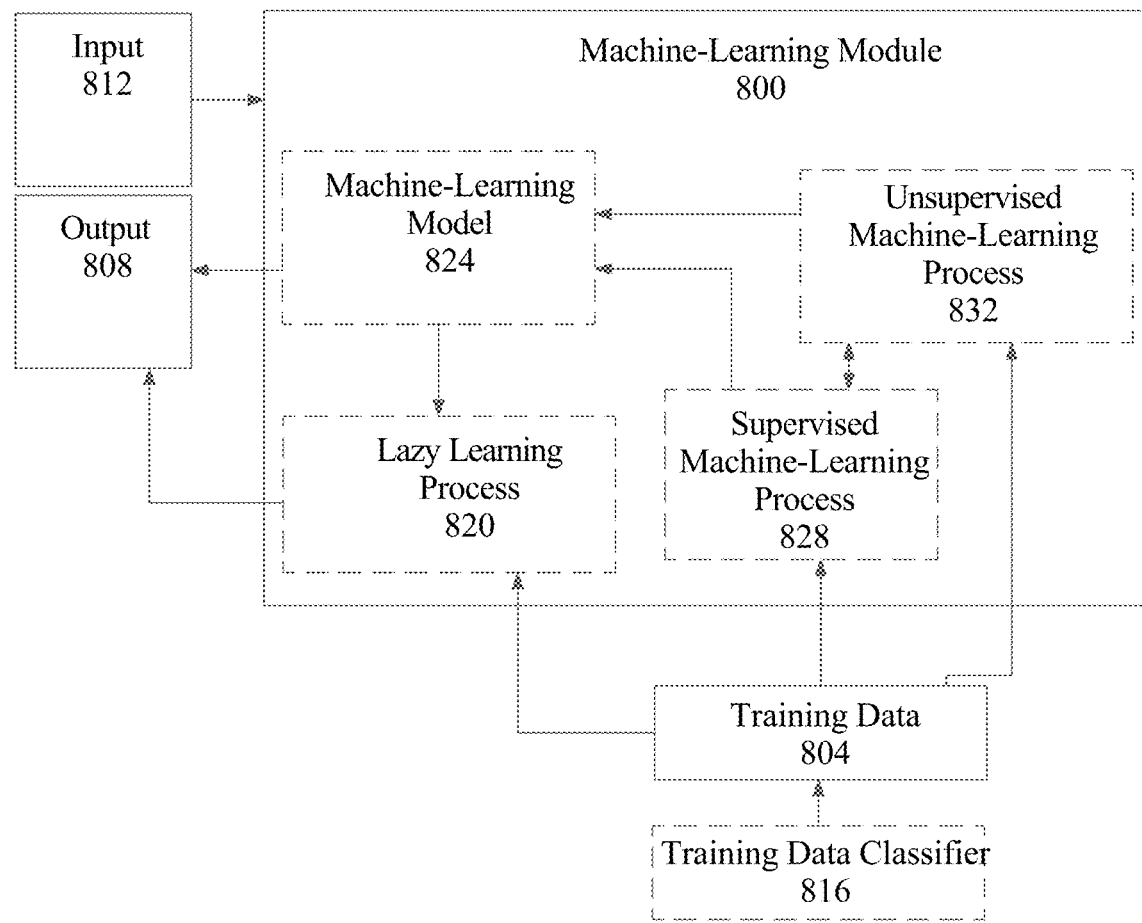
FIG. 8 is a block diagram of an exemplary machine-learning process.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example, the sensor datum may be an input and the charging instruction set and/or the safety lock instruction may be outputs.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to categorizes of various charging requirements that may be classified by the type of charger the electric aircraft may require, the type of battery pack the electric aircraft has, the type of flight plan the electric aircraft is following, and the like thereof for which each category may be prioritized for which a subset of training data may be selected.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the sensor datum as described above as inputs, the charging instruction set and safety lock instruction as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
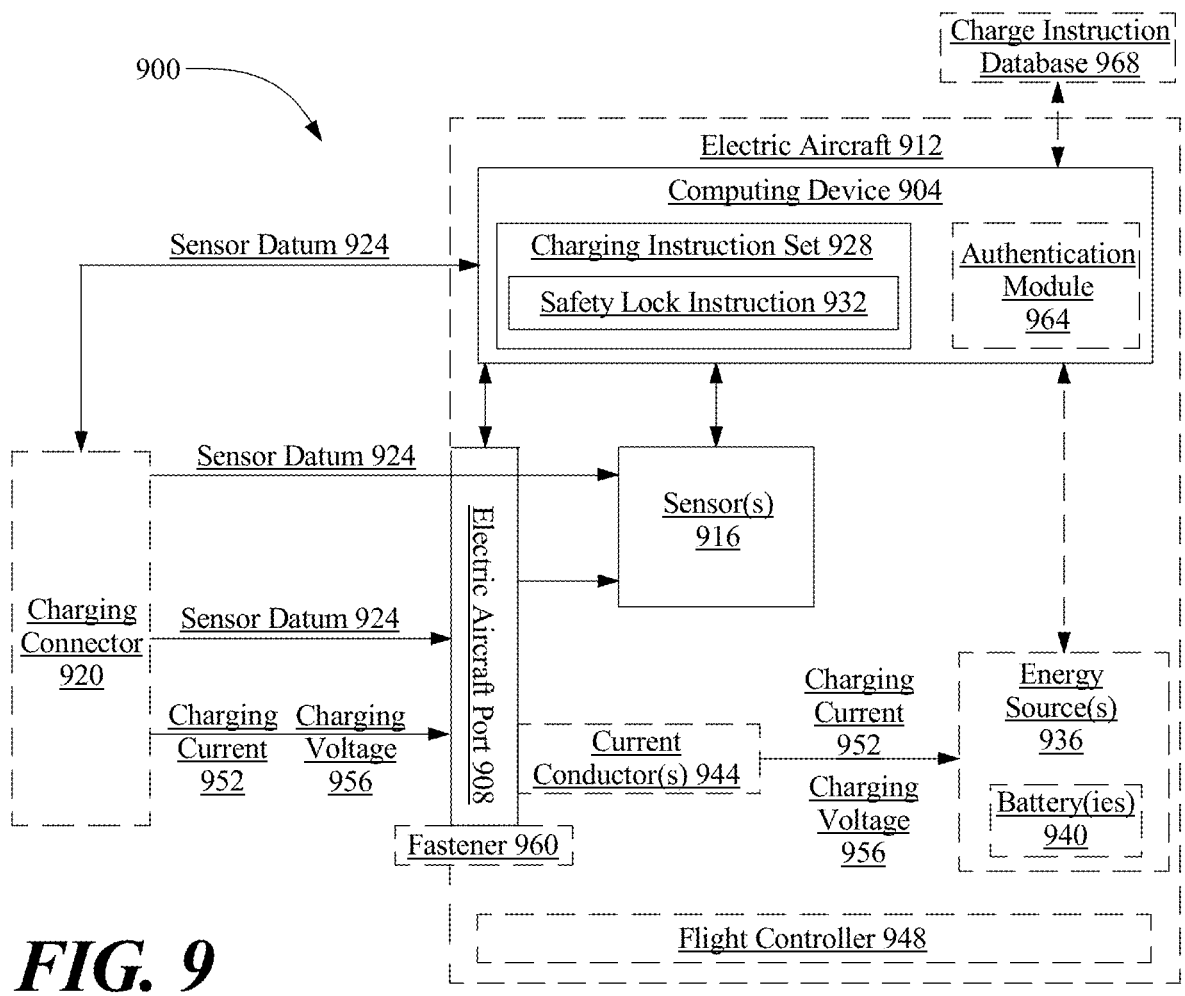
FIG. 9 is a block diagram of an exemplary embodiment of a system with a safety feature for charging an electric aircraft.

Referring now to FIG. 9, an exemplary embodiment of a system 900 with a safety feature for charging an electric aircraft is illustrated. System 900 includes a computing device (or controller) 904. Computing device 904 is communicatively connected to electric aircraft or at least to selected component(s) of electric aircraft. Computing device 904 may include any of the computing devices as disclosed in the entirety of the present disclosure. In some embodiments, computing device 904 may be on or onboard electric aircraft. In other embodiments, computing device 904 may be remote (or spaced from electric aircraft. Computing device 904 may be part of or included in a flight controller of electric aircraft. Alternatively, flight controller may be part of or included in computing device 904.

Still referring to FIG. 9, in some embodiments, system 900 includes an electric aircraft port 908 of an electric aircraft 912, a sensor 916 on electric aircraft 912 and computing device 904. Electric aircraft port 908 is configured to mate with a charging connector 920. Sensor 916 is configured to detect a sensor datum 924 of charging connector 920. Computing device 904 is communicatively connected to electric aircraft port 908 and sensor 916. Computing device 904 is configured to receive sensor datum 924. Computing device 904 is configured to generate a charging instruction set 928 as a function of sensor datum 924. Charging instruction set 928 includes a safety lock instruction 932. Computing device 904 is configured to transmit charging instruction set 928 to electric aircraft port 908. Computing device 904 is configured to enable charging of electric aircraft 912, by charging connector 920 and through electric aircraft port 908, as a function of charging instruction set 928. In an embodiment, computing device 904 may be on or onboard electric aircraft 912.

Still referring to FIG. 9, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 9, in some embodiments, the functionality of system 900 may be substantially the same as that of system 100 (FIG. 1) except that implementation is now executed by an electric aircraft and/or its associated components (e.g. electric aircraft port) to achieve safety aspects related to charging (or recharging) of electric aircraft. In some cases, it can be considered without limitation, that charging connector of system 100 has reversed roles with electric aircraft port of system 900 which now controls the disclosed charging safety aspects. One of ordinary skill in the art will recognize that (with suitable modifications to system 100 of FIG. 1) system 900 can readily achieve similar execution as described above in connection with at least FIG. 1, FIG. 2, FIG. 3 and FIG. 4. However, for completeness, some of these aspects and/or features are further expanded upon herein with respect to system 900 including a safety feature for charging an electric aircraft.

Still referring to FIG. 9, in some embodiments, electric aircraft port 908 of electric aircraft 912 is configured to mate with charging connector 920. Electric aircraft port 908 may include any of the electric aircraft ports as disclosed herein and described above with reference to at least FIG. 1. Electric aircraft 912 may include any of the electric aircrafts as disclosed herein and described above with reference to at least FIG. 6. Charging connector 920 may include any of the charging connectors as disclosed herein and described above with reference to at least FIG. 1. Mating may be by any mating means as disclosed in the entirety of the present disclosure.

Still referring to FIG. 9, as used in this disclosure, "charging" or "recharging" refers to a process of increasing energy stored within an energy source. In some cases, an energy source may include at least a battery and charging may include providing an electrical flow or current to at least a battery. As used in this disclosure, an "electrical flow" or "current" is a flow of charged particles (e.g. electrons) or an electric current flowing within a material or structure which is capable of conducting it.

Continuing to refer to FIG. 9, as used in this disclosure, an "electric aircraft" is an electrically powered aircraft such as one powered by one or more electric motors or the like. In some embodiments, electrically powered (or electric) aircraft may be an electric vertical takeoff and landing (eVTOL) aircraft. In some embodiments, electric aircraft may include a hybrid-electric aircraft, for example and without limitation, an aircraft that may be powered by both electricity and combustion (e.g. internal combustion). Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

With continued reference to FIG. 9, as used in this disclosure, a "vertical take-off and landing (VTOL) aircraft" is one that can hover, take off, and land vertically. An "electric vertical takeoff and landing aircraft" or "eVTOL aircraft", as used in this disclosure, is an electrically powered VTOL aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight. In an embodiment, electric aircraft 200 may be a hybrid-electric aircraft and may be powered by a hybrid-electric power system. A hybrid-electric vehicle (HEV) or aircraft, as used in the present disclosure, is a type of hybrid vehicle or aircraft that combines a conventional internal combustion engine (ICE) system with an electric propulsion system.

Still referring to FIG. 9, in an embodiment, electric aircraft port 908 may be electrically connected to at least an energy source 936 of electric aircraft 912. As also noted above, as used in this disclosure, "electrically connected" is two or more components electrically, or otherwise connected and configured to transmit and receive signals from one another. Energy source(s) 936 may include, without limitation, one or more battery packs, battery modules, battery units, batteries, battery cells, cells, or the like, as needed or desired, which may efficaciously be located at different locations on aircraft 912.

Still referring to FIG. 9, as used in this disclosure, an "energy source" is a source (or supplier) of energy (or power) to power one or more components. Energy source 936 may include one or more battery(ies) 940 and/or battery packs. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power. For example, and without limitation, energy source may be configured provide energy to an aircraft power source that in turn that drives and/or controls any other aircraft component such as other flight components. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, a battery pack, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

In an embodiment, and with continued reference to FIG. 9, an energy source may be used to provide a steady supply of electrical flow or power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high state of charge (SOC), as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Lithium ion (Li-ion) batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 9, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

Continuing to refer to FIG. 9, energy sources, battery packs, batteries, sensors, battery sensors, sensor suites and/ or associated methods which may efficaciously be utilized in accordance with some embodiments are disclosed in U.S. Nonprovisional application Ser. No. 17/111,002, filed on Dec. 3, 2020, entitled "SYSTEMS AND METHODS FOR A BATTERY MANAGEMENT SYSTEM INTEGRATED IN A BATTERY PACK CONFIGURED FOR USE IN ELECTRIC AIRCRAFT,", U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT,", and U.S. Nonprovisional application Ser. No. 17/320,329, filed on May 14, 2021, and entitled "SYSTEMS AND METHODS FOR MONITORING HEALTH OF AN ELECTRIC VERTICAL TAKE-OFF AND LANDING VEHICLE,", the entirety of each one of which is incorporated herein by reference.

With continued reference to FIG. 9, other energy sources, battery packs, batteries, sensors, battery sensors, sensor suites and/or associated methods which may efficaciously be utilized in accordance with some embodiments are disclosed in U.S. Nonprovisional application Ser. No. 16/590,496, filed on Oct. 2, 2019, and entitled "SYSTEMS AND METHODS FOR RESTRICTING POWER TO A LOAD TO PREVENT ENGAGING CIRCUIT PROTECTION DEVICE FOR AN AIRCRAFT,", U.S. Nonprovisional application Ser. No. 17/348,137, filed on Jun. 15, 2021, and entitled "SYSTEMS AND METHODS FOR RESTRICTING POWER TO A LOAD TO PREVENT ENGAGING CIRCUIT PROTECTION DEVICE FOR AN AIRCRAFT,", U.S. Nonprovisional application Ser. No. 17/008,721, filed on Sep. 1, 2020, and entitled "SYSTEM AND METHOD FOR SECURING BATTERY IN AIRCRAFT,", U.S. Nonprovisional application Ser. No. 16/948,157, filed on Sep. 4, 2020, and entitled "SYSTEM AND METHOD FOR HIGH ENERGY DENSITY BATTERY MODULE,", U.S. Nonprovisional application Ser. No. 16/948,140, filed on Sep. 4, 2020, and entitled "SYSTEM AND METHOD FOR HIGH ENERGY DENSITY BATTERY MODULE,", and U.S. Nonprovisional application Ser. No. 16/948,141, filed on Sep. 4, 2020, and entitled "COOLING ASSEMBLY FOR USE IN A BATTERY MODULE ASSEMBLY,", the entirety of each one of which is incorporated herein by reference. Still other energy sources, battery packs, batteries, sensors, sensor suites, charging techniques, charging devices, charging systems, charging connectors and/or associated methods which may efficaciously be utilized in accordance with some embodiments are disclosed in U.S. Nonprovisional application Ser. No. 17/405,840, filed on Aug. 18, 2021, entitled "CONNECTOR AND METHODS OF USE FOR CHARGING AN ELECTRIC VEHICLE,", the entirety of which is incorporated herein by reference.

Still referring to FIG. 9, in an embodiment, electric aircraft port 908 may be electrically connected to at least a current conductor 944 configured to charge at least a battery 940 of electric aircraft 912. As used in this disclosure, a "current conductor" is a conductor capable of conducting an electric current. Current conductor(s) 944 may include any of the current conductors as disclosed in the entirety of the present disclosure such as, and without limitation, a DC conductor, an AC conductor, and the like, among others. At least a portion of current conductor 944 may be located in or at electric aircraft port 908. Electric aircraft port 908 may further include and/or be connected to one or more ground conductors, control signal conductors (control pilots), which are disclosed herein, and the like, among others.

Still referring to FIG. 9, charging connector 920 may be configured to provide a charging current 952 and/or a charging voltage 956 to electric aircraft port 908. This charging current 952 and/or charging voltage 956 is then transmitted or provided to energy source(s) 936 of electric aircraft 912 to charge (or recharge) one or more batteries 940. Charging current 952 and/or charging voltage 956 may be conducted, transmitted or provided by one or more current conductors 944 or the like, as needed or desired.

Still referring to FIG. 9, in some embodiments, sensor 916 is configured to detect sensor datum 924 of charging connector 920. Sensor 916 may include a plurality of sensors and/or a sensor suite. Sensor(s) 916 may be on or at electric aircraft 912. Alternatively, or additionally, sensor(s) may be provided at charging connector 920. Sensor(s) 916 may include any of the sensors as disclosed herein and described above with reference to at least FIG. 1. Sensor datum 924 may include any of the sensor datums as disclosed herein and described above with reference to at least FIG. 1. Detection may be by any detection means as disclosed in the entirety of the present disclosure. In an embodiment, sensor(s) 916 may be communicatively and/or electrically connected to electric aircraft port 908.

Still referring to FIG. 9, as used in this disclosure, and especially with reference to system 900, a "sensor" is a device that is configured to detect a phenomenon and transmit information related to the detection of the phenomenon; a sensor may include any sensor as defined and/or described above. As used in this disclosure, and especially with reference to system 900, a "sensor datum" is information on a phenomenon as detected by a sensor. For example, in some cases a sensor may transduce a detected phenomenon, such as without limitation current, voltage, resistance, capacitance, impedance, distance, speed, velocity, angular velocity, rotational velocity, acceleration, direction, force, torque, temperature, pressure, humidity, precipitation, density, and the like, into a sensed signal and/or sensor datum. Sensor may include one or more sensors which may be the same, similar or different. Sensor may include a plurality of sensors which may be the same, similar or different. Sensor may include one or more sensor suites with sensors in each sensor suite being the same, similar or different.

Still referring to FIG. 9, in certain embodiments, sensor(s) 916 may, alternatively or additionally, be configured to detect data of or on electric aircraft. Sensor 916 may include any sensor or noise monitoring circuit described in this disclosure. Sensor 916, in some embodiments, may be communicatively connected or coupled to a flight controller 948 of electric aircraft 912. Sensor may be a device, module, and/or subsystem, utilizing any hardware, software, and/or any combination thereof to sense a characteristic and/or changes thereof, in an instant environment, for example and without limitation, which the sensor may be proximal to or otherwise in a sensed communication with, and transmit information associated with the characteristic, for instance without limitation digitized data. Sensor may be mechanically and/or communicatively coupled to electric aircraft. Sensor may be configured to sense a characteristic associated with, for example and without limitation, a battery and/or a pilot control of aircraft. An environmental sensor may include without limitation one or more sensors used to detect ambient temperature, barometric pressure, and/or air velocity. Sensor may include without limitation gyroscopes, accelerometers, inertial measurement unit (IMU), and/or magnetic sensors, one or more humidity sensors, one or more oxygen sensors, or the like. Additionally or alternatively, sensor may include at least a geospatial sensor. Sensor may be located inside aircraft, and/or be included in and/or attached to at least a portion of aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or, in some cases, be remote.

Continuing to refer to FIG. 9, non-limiting examples of sensor 916 may include an inertial measurement unit (IMU), an accelerometer, a gyroscope, a proximity sensor, a pressure sensor, a light sensor, a pitot tube, an air speed sensor, a wind sensor, a position sensor, a speed sensor, a switch, a thermometer, a strain gauge, an acoustic sensor, an electrical sensor, a current sensor, a voltage sensor, a capacitance sensor, a resistance sensor, an impedance sensor, a thermal sensor, a humidity sensor, an angle sensor, a velocity sensor, an acceleration sensor, an optical sensor, a magnetic sensor, an electromagnetic sensor, and the like, among others. In some cases, sensor may sense a characteristic as an analog measurement, for instance, yielding a continuously variable electrical potential indicative of the sensed characteristic. In these cases, sensor may additionally comprise an analog to digital converter (ADC) as well as any additionally circuitry, such as without limitation a Wheatstone bridge, an amplifier, a filter, and the like. For instance, in some cases, sensor may comprise a strain gage configured to determine loading of one or more aircraft components, for example and without limitation, landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft, for instance without limitation a computing system, a pilot display, and a memory component. Alternatively or additionally, sensor may sense a characteristic of a pilot control digitally. For instance in some embodiments, sensor may sense a characteristic through a digital means or digitize a sensed signal natively. In some cases, for example, sensor may include a rotational encoder and be configured to sense a rotational position of a pilot control or the like; in this case, the rotational encoder digitally may sense rotational "clicks" by any known method, such as without limitation magnetically, optically, and the like. Sensor may include any of the sensors as disclosed in the present disclosure. Sensor may include a plurality of sensors. Any of these sensors may be located at any suitable position in or on aircraft.

With continued reference to FIG. 9, sensor 916 may include any device configured to measure and/or detect information related to charging connector 920 and/or electric aircraft 912. In a non-limiting embodiment, sensor may include airspeed sensors, GPS sensors, altimeters, pitot tubes, pitot-static tubes, sensors and/or systems, external air density sensors (e.g. to facilitate in the calculation of stall speed and/or wind speed), pressure sensors, toque sensors, angle sensors (e.g., angle of attack, flight path angle), wind speed sensors, and the like, among others.

Still referring to FIG. 9, in some embodiments, computing device 904 is communicatively connected to electric aircraft port 908 and sensor 916. This connection may include, without limitation, an electrical and/or mechanical connection. Computing device 904 may also be communicatively connected to current conductor(s) 944, energy source(s) 936 and/or flight controller 948. Computing device may further be communicatively connected to one or more fasteners 960, an authentication module 964 and/or a charge instruction database 968.

Still referring to FIG. 9, in some embodiments, computing device 904 is configured to receive sensor datum 924. Sensor datum 924 may be transmitted or provided to computing device 904 by a wireless connection and/or a wired connection. In an embodiment, sensor datum 924 may be provided to electric aircraft port 908 by charging connector 920 when they are mated or connected. Sensor datum 924 may then be transmitted or provided to sensor 916 which in turn be transmit or provide it to computing device 904. In another embodiment, sensor datum 924 may be provided or transmitted by charging connector 920 to sensor 916 directly, for example and without limitation, by a wireless connection. Sensor 916 may then transmit or provide sensor datum 924 to computing device 904. In yet another embodiment, sensor datum 924 may be provided or transmitted by charging connector 920 to computing device 904 directly, for example and without limitation, by a wireless connection. In an embodiment, one or more sensors 916 may be included in computing device 904, as needed or desired.

Still referring to FIG. 9, in some embodiments, computing device 904 is configured to generate charging instruction set 928, as a function of sensor datum 924, including a safety lock instruction 932. Charging instruction set 928 and safety lock instruction 932 may include any charging instruction sets and safety lock instructions, respectively, as disclosed in the entirety of the present disclosure. However, with particular respect to system 900, charging instruction set 928 and/or safety lock instruction 932 may include certain distinct features. Additionally, with particular respect to system 900, sensor datum 924 may also include certain distinct features.

Still referring to FIG. 9, in general, sensor datum 924 may include any information relating to charging (or recharging) of an electric aircraft. This may include sensory information on electric aircraft's components and flight as well as sensory information on charging connector and charging station. In some embodiments, as relating to the embodiment of FIG. 9, sensor datum may include information on compatibility between a specific charging connector 920 and a particular electric aircraft 912. For example, and without limitation, sensor datum may include information on whether a charging connector is physically configured to mate with electric aircraft port, whether a power supply of charging connector is adequate to meet the aircraft's charging needs, whether the form and/or magnitude of electrical current provided by charging connector is acceptable by the energy source and/or battery(ies) of electric aircraft, and the like, among others.

Still referring to FIG. 9, as also noted above, a "charging instruction set" is an operational direction regarding implementation of charging or recharging for electric aircrafts. This may include, without limitation, specifics on charging current, charging voltage, charging duration as well as a safety feature to determine whether or not charging should be permitted or enabled. Such a safety feature may be implemented by safety lock instruction 932. As also noted above, a "safety lock instruction" is a safety feature and an operational direction or implementation for charging connector 128 and any locking mechanism it may have. This may be implemented, for example and without limitation, by enabling or disabling connection or mating between charging connector 920 and electric aircraft port 908, by enabling or disabling electrical flow or charging current through electric aircraft port 908 and/or from charging connector 920, and the like. In some embodiments, a fastener 960 or the like may be used for such a purpose, as needed or desired. Fastener 960 may include any of the fasteners as disclosed in the entirety of the present disclosure including those described above with reference to at least FIG. 1. As also noted above, a "fastener" is a physical component that is designed and/or configured to attach or fasten two (or more) components together.

Continuing to refer to FIG. 9, in some embodiments, computing device 904 is configured to transmit charging instruction set 928 to electric aircraft port 908. This may also allow implementation of enablement or disablement of charging at electric aircraft port 908 by charging connector 920. Similar, or other, instructions may also be provided by computing device 904 to, without limitation, charging connector 920, current conductor(s) 944, fastener(s) 960, flight controller 948, energy source(s) 936, and the like, among other components and devices.

With continued reference to FIG. 9, in some embodiments, computing device 904 is configured to enable (or disable) charging of electric aircraft 912, by charging connector 920 and through electric aircraft port 908, as a function of charging instruction set 928. In an embodiment, system 900 may further include one or more fasteners 960. Fastener9s) 960 may be configured to enable and disable mating between electric aircraft port 908 and charging connector 920 as a function of safety lock instruction 932 and/or charging instruction set 928. In an embodiment, fastener 960 may be located at electric aircraft port 908 and may be a part of electric aircraft 912.

Still referring to FIG. 9, in an embodiment, computing device 904 may be further configured to enable locking of fastener 960 between electric aircraft port 908 and charging connector 920 as a function of safety lock instruction 932 and/or charging instruction set 928. Locking of fastener 960 may include mating, connection or engagement between electric aircraft port 908 and charging connector 920 so that supply of charging current 952 and/or charging voltage 956 may be provided to energy source(s) 936.

Still referring to FIG. 9, in an embodiment, computing device 904 may be further configured to disable locking (or enable unlocking) of fastener 960 between electric aircraft port 908 and charging connector 920 as a function of safety lock instruction 932 and/or charging instruction set 928. Unlocking of fastener 960 may include disconnection or disengagement between electric aircraft port 908 and charging connector 920 so that charging current 952 and/or charging voltage 956 may not be provided to energy source(s) 936. Unlocking of fastener 960 may also include disruption of charging current 952 and/or charging voltage 956 to energy source(s) 936 even in the event there is mating or connection between electric aircraft port 908 and charging connector 920. In some cases, unlocking of fastener 960 may include disability of electric aircraft port 908 and charging connector 920 to mate or form a connection.

Still referring to FIG. 9, in an embodiment, computing device 904 may be further configured to maintain locking of fastener 960 between electric aircraft port 908 and charging connector 920 until completion of charging instruction set 928. This may ensure uninterrupted charging (or recharging) of energy source(s) 936 of electric aircraft 912 until the desired, or needed, state of charge (SOC) is achieved.

Still referring to FIG. 9, certain features of charging systems, methods and techniques including a charging connector, controller, sensors and associated components and devices, which may efficaciously be utilized in accordance with certain embodiments of the present disclosure are disclosed in U.S. Nonprovisional application Ser. No. 17/405,840, filed on Aug. 18, 2021, entitled "CONNECTOR AND METHODS OF USE FOR CHARGING AN ELECTRIC VEHICLE,", U.S. Nonprovisional application Ser. No. 17/515,512, filed on Oct. 31, 2021, entitled "PROXIMITY DETECTION SYSTEMS AND METHODS FOR FACILITATING CHARGING OF ELECTRIC AIRCRAFT, ", U.S. Nonprovisional application Ser. No. 17/515,508, filed on Oct. 31, 2021, entitled "CONNECTOR WITH AMBIENCE MONITORING CAPABILITY AND METHODS OF USE FOR CHARGING AN ELECTRIC AIRCRAFT,", U.S. Nonprovisional application Ser. No. 17/515,515, filed on Oct. 31, 2021, entitled "CONNECTOR WITH OVERVOLTAGE PROTECTION AND METHODS OF USE FOR CHARGING AN ELECTRIC AIRCRAFT,"U.S. Nonprovisional application Ser. No. 17/515,594, filed on Nov. 1, 2021, entitled "SYSTEMS AND METHODS FOR PRE-CHARGING SHORT CIRCUIT DETECTION IN ELECTRIC AIRCRAFT,", U.S. Nonprovisional application Ser. No. 17/515,521, filed on Oct. 31, 2021, entitled "SYSTEMS AND METHODS FOR REGULATING CHARGING OF AN ELECTRIC AIRCRAFT,", and U.S. Nonprovisional application Ser. No. 17/407,330, filed on Aug. 20, 2021, entitled "CONNECTOR AND METHODS OF USE FOR CHARGING AN ELECTRIC VEHICLE,", the entirety of each one of which is incorporated herein by reference.

With continued reference to FIG. 9, in an embodiment, system 100 may be further configured to authenticate charging connector 920 (and/or associated charging station). Authentication may be performed by authentication module 964 which may be a part of computing device 904 and/or may be communicatively connected to computing device 904. Authentication may be by any suitable authentication means as disclosed in the entirety of the present disclosure and described above with reference to at least FIG. 1, FIG. 2, FIG. 3 and FIG. 4. For the purposes of system 900, an "authentication module" is a hardware and/or software module configured to authenticate a charging connector and/or charging station.

Still referring to FIG. 9, in an embodiment, computing device 904 may be further configured to authenticate charging connector 904 as a function of authentication module 964. Authentication module 964 may be configured to receive a physical signature from charging connector, compare the physical signature from the charging connector to an authorized biometric credential stored within a physical signature database, and bypassing authentication for the charging connector based on the comparison of the physical signature from charging connector to the authorized physical signature stored within the physical signature database. Any of the embodiments as described above in connection with FIG. 2, FIG. 3 and FIG. 4 may be used to perform such an authentication technique.

Still referring to FIG. 9, in an embodiment, computing device 904 may be communicatively connected to charge instruction database 968. Charge instruction database 968 may include any of the charge instruction databases as disclosed in the entirety of the present disclosure and described above with reference to at least FIG. 1. As also noted above, a "charge instruction database" is data storage system configured to store any datum received and/or generated by a computing device that may be used to generate a charging instruction set.

Still referring to FIG. 9, in an embodiment, computing device 904 may be further configured to train a machine-learning model as a function of a training set, wherein the training data correlates a sensor data correlated to a charging instruction set data, and output the charging instruction set as a function of the sensor datum and the machine-learning model. Any of the machine-learning processes, models and/or algorithms as disclosed in the entirety of the present disclosure may be used to perform such training, for example and without limitation, as described above with reference to at least FIG. 8.

Figure 10:
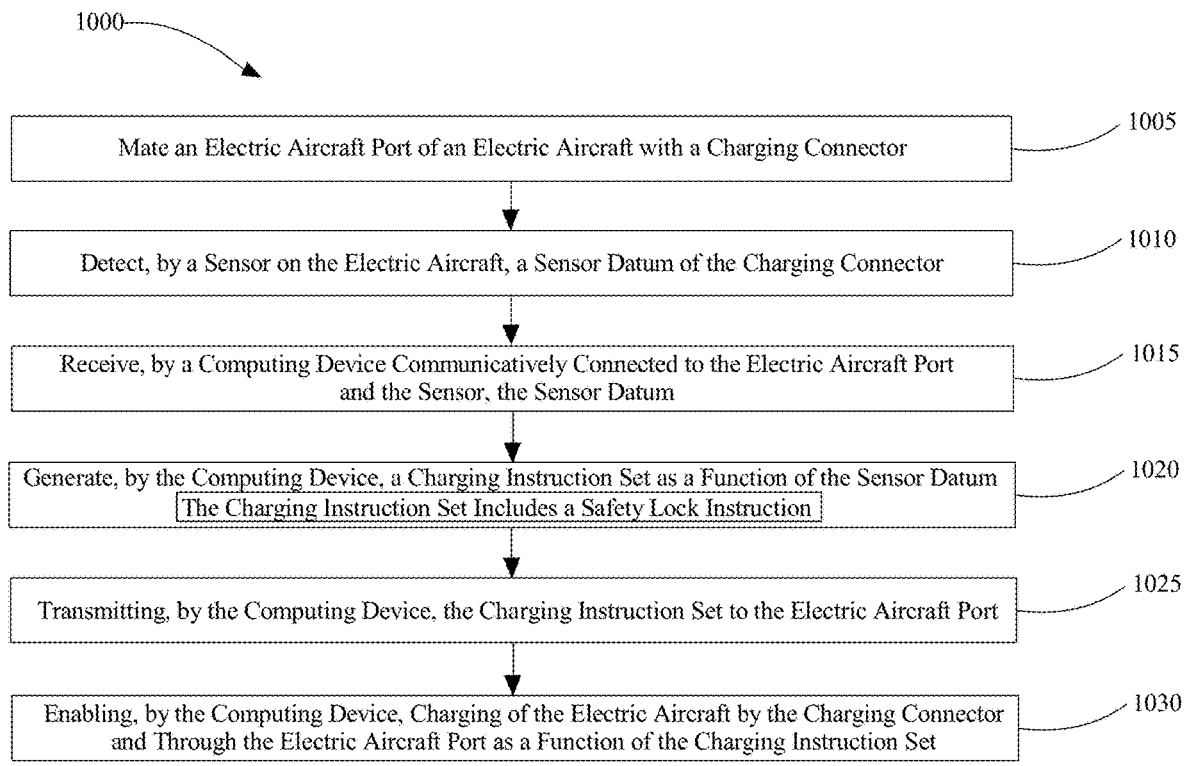
FIG. 10 is a block diagram of an exemplary embodiment of a method with a safety feature for charging an electric aircraft.

Now referring to FIG. 10, an exemplary embodiment of a method 1000 with a safety feature for charging an electric aircraft is illustrated. Electric aircraft may be any of the aircrafts as disclosed herein and described above with reference to at least FIG. 6 and FIG. 9. In an embodiment, electric aircraft may include an electric vertical takeoff and landing (eVTOL) aircraft.

Still referring to FIG. 10, at step 1005, an electric aircraft port of an electric aircraft is mated with a charging connector. Electric aircraft port may include any of the electric aircraft ports as disclosed herein and described above with reference to at least FIG. 1 and FIG. 9. Electric aircraft may include any of the electric aircrafts as disclosed herein and described above with reference to at least FIG. 6 and FIG. 9. Charging connector may include any of the charging connectors as disclosed herein and described above with reference to at least FIG. 1 and FIG. 9. Mating may be by any mating means as disclosed in the entirety of the present disclosure.

Still referring to FIG. 10, at step 1010, a sensor datum of charging connector is detected by a sensor on electric aircraft. Sensor datum may include any of the sensor datums as disclosed herein and described above with reference to at least FIG. 1 and FIG. 9. Sensor may include any of the sensors as disclosed herein and described above with reference to at least FIG. 1 and FIG. 9. Detection may be by any detection means as disclosed in the entirety of the present disclosure.

Still referring to FIG. 10, at step 1015, sensor datum is received by a computing device communicatively connected to electric aircraft port and sensor. Computing device may include any of the computing devices as disclosed herein and described above with reference to at least FIG. 1 and FIG. 9. Receiving may be by any receiving means as disclosed in the entirety of the present disclosure.

Still referring to FIG. 10, at step 1020, a charging instruction set is generated, by computing device, as a function of sensor datum. Charging instruction set includes a safety lock instruction. Charging instruction set may include any of the charging instruction sets as disclosed herein and described above with reference to at least FIG. 1 and FIG. 9. Safety lock instruction may include any of the safety lock instructions as disclosed herein and described above with reference to at least FIG. 1 and FIG. 9. Generating may be by any generating means as disclosed in the entirety of the present disclosure.

Continuing to refer to FIG. 10, at step 1025, charging instruction set is transmitted, by computing device, to electric aircraft port. Transmission may be by any transmission means as disclosed in the entirety of the present disclosure.

With continued reference to FIG. 10, at step 1030, charging of electric aircraft by charging connector and through electric aircraft port is enabled, by computing device, as a function of charging instructions set. Charging may be by any charging means as disclosed in the entirety of the present disclosure. Enabling may be by any enabling means as disclosed in the entirety of the present disclosure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
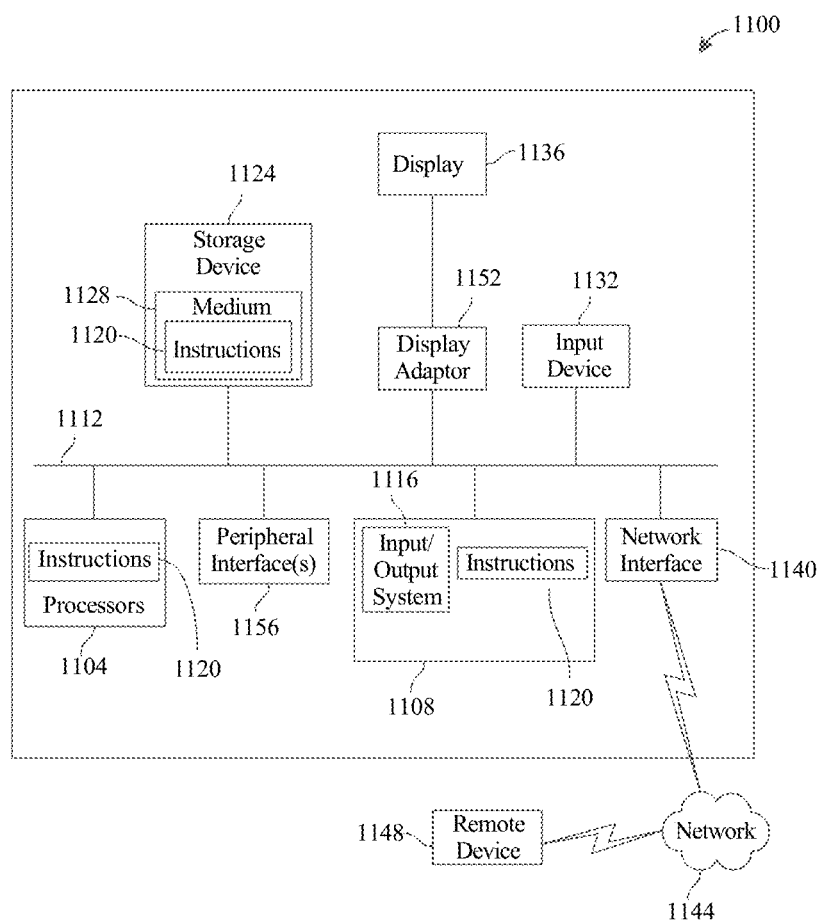
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system, comprising:
    an electric vehicle including a port configured to mate with a charging connector, and a sensor configured to detect a separation between the port and the charging connector; and
    a computing device communicatively connected to the port and the sensor, wherein the computing device is configured to:
        prevent the charging connector from charging the electric vehicle in response to the separation being greater than a threshold value;
        generate a charging instruction in response to the separation being less than the threshold value, the charging instruction including a charge time for the electric vehicle;
        enable charging of the electric vehicle via the charging connector through the port for the charge time of the charging instruction; and
        disable charging of the electric vehicle from the charging connector in response to the electric vehicle being charged for the charge time.

2. The system of claim 1, wherein the computing device is on the electric vehicle.

3. The system of claim 1, wherein the port is electrically connected to an energy source of the electric vehicle.

4. The system of claim 1, wherein the port is electrically connected to a current conductor configured to charge a battery of the electric vehicle.

5. The system of claim 1, wherein the sensor is communicatively connected to the port.

6. The system of claim 1, wherein the computing device is further configured to enable locking of a fastener between the port and the charging connector as a function of a safety lock instruction.

7. The system of claim 1, wherein the computing device is further configured to disable locking of a fastener between the port and the charging connector after the electric vehicle is charged for the charge time.

8. The system of claim 1, wherein the computing device is further configured to maintain locking of a fastener between the port and the charging connector throughout the charge time.

9. The system of claim 1, wherein the system further comprises a fastener, configured to enable and disable mating between the port and the charging connector.

10. The system of claim 9, wherein the fastener is located at the port.

11. A method, comprising:
    mating a port of an electric aircraft with a charging connector;
    detecting, by a sensor, a separation between the port and the charging connector;
    preventing, by a computing device in communication with the sensor, the charging connector from charging the electric vehicle in response to the separation being greater than a threshold value;
    generating, by the computing device, a charging instruction in response to the separation being less than the threshold value, the charging instruction including a charge time for the electric vehicle;
    charging the electric vehicle via the charging connector through the port for the charge time of the charging instruction; and
    disabling charging of the electric vehicle from the charging connector in response to the electric vehicle being charged for the charge time.

12. The method of claim 11, wherein the computing device is on the electric vehicle.

13. The method of claim 11, wherein the port is electrically connected to an energy source of the electric vehicle.

14. The method of claim 11, wherein the port is electrically connected to a current conductor configured to charge a battery of the electric vehicle.

15. The method of claim 11, wherein the sensor is communicatively connected to the port.

16. The method of claim 11, further comprising locking a fastener between the port and the charging connector.

17. The method of claim 11, further comprising disabling locking of a fastener between the port and the charging connector after the electric vehicle is charged for the charge time.

18. The method of claim 11, further comprising maintaining locking of a fastener between the port and the charging connector throughout the charge time.

19. The method of claim 11, further comprising enabling, by a fastener, mating between the port and the charging connector before the electric vehicle is charged for the charge time.

20. The method of claim 19, wherein the fastener is located at the port.

* * * * *